US012573948B2

(12) United States Patent (10) Patent No.: US 12,573,948 B2
Eversmann et al. (45) Date of Patent: Mar. 10, 2026

(54) INTEGRATED INVERTING/NON-INVERTING RECUPERATING HIGH-VOLTAGE-CONVERSION-RATIO CAPACITIVE LOAD DRIVER

(71) Applicant: Infineon Technologies AG, Neubiberg (DE)

(72) Inventors: Bjoern Oliver Eversmann, Aidenbach (DE); Moritz Gruber, Munich (DE); Markus Hänsler, Heiligenkreuz am Waasen (AT); Lei Liao, Unterhaching (DE); Simone Fabbro, Udine (IT); Andreas Wiesbauer, Pörtschach a. W. (AT)

(73) Assignee: Infineon Technologies AG, Neubiberg (DE)

( * ) Notice: Subject to any disclaimer, the term of this patent is extended or adjusted under 35 U.S.C. 154(b) by 18 days.

(21) Appl. No.: 18/640,572

(22) Filed: Apr. 19, 2024

(65) Prior Publication Data

US 2025/0330083 A1 Oct. 23, 2025

(51) Int. Cl.
*H02M 3/07* (2006.01)
*H02M 1/08* (2006.01)

(52) U.S. Cl.
CPC .............. *H02M 3/07* (2013.01); *H02M 1/08* (2013.01)

(58) Field of Classification Search
CPC .......... H02M 3/07; H02M 1/08; H02M 3/072; H02M 3/073; G11C 5/145; H03M 1/12; H03M 1/34; H03M 1/20; H03M 1/14; H03M 1/1205; H03M 1/66; H03M 1/661; H03M 1/802; H03M 1/80; H03M 1/804
See application file for complete search history.

(56) References Cited

U.S. PATENT DOCUMENTS

2010/0253154 A1* 10/2010 Yeates ..................... H02M 3/07
307/110

OTHER PUBLICATIONS

Hansler, Markus et al., "Design Considerations for a Digital Input MEMS Speaker Audio Amplifier with Energy Recovery", MEMS and Piezoelectrical Sensors, Prime 2019, Switzerland, Jul. 15-18, 2019, 4 pages.

Jiang, Xicheng "Fundamentals of Audio Class D Amplifier Design A review of schemes and architectures", IEEE Solid State Circuits Magazine, Summary 2017, 12 pages.

Lai, J.-S., et al., "Multilevel converters—A new breed of power converters", IEEE Trans. Ind. Applicat., vol. 32, No. 3, pp. 509-517, May-Jun. 1996.

Li, Yanqiao et al., "An Optically Powered, High-Voltage, Switched-Capacitor Drive Circuit for Microrobotics", IEEE Journal of Solid-State Circuits, vol. 56, No. 3, Mar. 2021, 10 pages.

(Continued)

*Primary Examiner* — Jung Kim
(74) *Attorney, Agent, or Firm* — Slater Matsil, LLP

(57) ABSTRACT
A driver circuit includes a series-parallel charge pump including switched capacitor cells, wherein the series-parallel charge pump generates coarse signal steps at a first output node and a second output node; a flying capacitor coupled between the first output node and the second output node; and a digital-to-analog converter (DAC) coupled between the first output node and the second output node including switched capacitors for generating a plurality of fine signal steps.

17 Claims, 14 Drawing Sheets

(56)     References Cited

OTHER PUBLICATIONS

Mohsenzadeh, M., et al., "Marxiplier: An Innovative Marx-Based Single-Source Multilevel Inverter With Voltage Multiplying Capability," in IEEE Transactions on Industrial Electronics, vol. 69, No. 1, pp. 357-364, Jan. 2022.

Peng, Fang Zheng. "A generalized multilevel inverter topology with self voltage balancing", IEEE Transactions on industry applications, 37.2 (2001): 611-618.

Seo, Seoktae et al., "An ultralow power wearable vital sign sensor using an electromagnetically reactive near field", Bioengineering & Translational Medicine, AlChE, May 2023, 12 pages.

Svensson, L.J., et al., "Driving a capacitive load without dissipating fCV/sup 2/", IEEE Symposium on Low Power Electronics, Oct. 10-12, 1994, 2 pages.

Wang, Chonghe et al., "Monitoring of the central blood pressure waveform via a conformal ultrasonic device", Nature Biomedical Engineering, Sep. 11, 2018, 23 pages.

Yang, Jiang, et al., "Algebraic Series-Parallel-Based Switched-Capacitor DC-DC Boost Converter With Wide Input Voltage Range and Enhanced Power Density", IEEE Journal of Solid State Circuits, vol. 54, No. 11, Nov. 2019, pp. 3118-3134.

Zhang, Xiang et al., "An 80.4% Peak Power Efficiency Adaptive Supply Class H Power Amplifier for Audio Applications", IEEE Transactions on Very Large Scale Integration (VLSI) Systems, vol. 25, No. 6, Jun. 2017, 12 pages.

Zou, Ke et al., "Switched-Capacitor-Cell-Based Voltage Multipliers and DC-AC Inverters", IEEE Transactions on Industry Applications, vol. 48, Issue 5, Sep.-Oct. 2012, 12 pages.

* cited by examiner

INTEGRATED INVERTING/NON-INVERTING RECUPERATING HIGH-VOLTAGE-CONVERSION-RATIO CAPACITIVE LOAD DRIVER

TECHNICAL FIELD

The present invention relates generally to an integrated inverting/non-inverting recuperating high-voltage-conversion-ratio capacitive load driver and a corresponding driving method.

BACKGROUND

Micro-Electro-Mechanical Systems (MEMS) enable a high level of miniaturization, robustness, and integration as well as cost and manufacturing advantages such as flow soldering capability. As is known in the arts MEMS devices are used in many applications as ultra-sonic actuators and sensors. Typical MEMS equivalent circuits are generally represented by a capacitive load that requires, in comparison to conventional inductive actuators, high-drive voltages significantly exceeding battery voltage levels. Due to the capacitive nature of the MEMS actuator and sensor devices, high reactive power is required for charging and discharging associated with periodic excitation, actuation, or sensing. This is especially true when the MEMS devices are modulated at high operating frequencies.

Most state of the art drivers lack recuperation capabilities and so fully dissipate all of its stored energy. This in turn causes excessive power consumption and battery drain, which is unacceptable for small-form factor battery powered applications. A 200 pF MEMS load driven without recuperation at 30 Vpp (peak to peak) with a frequency of 1 MHz causes 180 mW of power dissipation, or greater than ten times the typical system power dissipation of, for example, portable ear-buds or true wireless (TWS) earbuds. Therefore, capacitive MEMS devices typical do not work with portable applications unless energy can be recuperated in face of high-voltage conversion ratios and high-operation frequencies, which are mutually exclusive design targets.

High-Dynamic-Range applications, especially audio applications, require efficient drive at both peak and typical Least-Significant-Bit-switching (LSB) amplitudes to be energy efficient overall. As the recuperation drops with dropping amplitude for established known integrated capacitive MEMS drivers, significant recuperation and sufficient efficiency at typical playback is not achievable with state-of-the-art concepts.

An example of a prior art driver circuit for driving a MEMS load is shown in FIG. 2. Driver circuit 200 includes a differential input at nodes 210 and 212 for receiving a supply or input voltage $V_{in}$. Driver circuit 200 includes a plurality of switching cells 202, 204, and 206, as well as an output cell 208. Switching cell 202 is coupled to a flying capacitor circuit 228, switching cell 204 is coupled to a flying capacitor circuit 230, and switching cell 206 is coupled to a flying capacitor circuit 232. Each switching cell comprises three switching transistors including transistor $M_{ParP}$, $M_{Up}$, and $M_{ParN}$.

In switching cell 202, transistor $M_{ParP}$ is coupled between nodes 210 and 214, transistor $M_{Up}$ is coupled between nodes 210 and 216, and transistor $M_{ParN}$ is coupled between nodes 212 and 216. Capacitor circuit 228 includes capacitor $C_{Fly}$ coupled between nodes 214 and 216. As a consequence of parasitic capacitances between flying capacitor plates and bulk the capacitor $\alpha_T{}^*C_{Fly}$ coupled between node 214 and ground, and capacitor $\alpha_B{}^*C_{Fly}$ coupled between node 216 and ground occur, where $\alpha_T$ denotes the fraction of parasitic bulk capacitance in relation to the flying Capacitance.

In switching cell 202, transistor $M_{ParP}$ is coupled between nodes 210 and 214, transistor $M_{Up}$ is coupled between nodes 210 and 216, and transistor $M_{ParN}$ is coupled between nodes 212 and 216. Capacitor circuit 228 includes capacitor $C_{Fly}$ coupled between nodes 214 and 216, and parasitic capacitances $\alpha_T{}^*C_{Fly}$ coupled between node 214 and ground, and capacitor $\alpha_B{}^*C_{Fly}$ coupled between node 216 and ground occur.

In switching cell 204, transistor $M_{ParP}$ is coupled between nodes 214 and 218, transistor $M_{Up}$ is coupled between nodes 214 and 220, and transistor $M_{ParN}$ is coupled between nodes 216 and 220. Capacitor circuit 230 includes capacitor $C_{Fly}$ coupled between nodes 218 and 220, and parasitic capacitances $\alpha_T{}^*C_{Fly}$ coupled between node 218 and ground, and capacitor $\alpha_B{}^*C_{Fly}$ coupled between node 220 and ground.

In switching cell 206, transistor $M_{ParP}$ is coupled between nodes 218 and 222, transistor $M_{Up}$ is coupled between nodes 218 and 224, and transistor $M_{ParN}$ is coupled between nodes 220 and 224. Capacitor circuit 232 includes capacitor $C_{Fly}$ coupled between nodes 222 and 224, capacitor $\alpha_T{}^*C_{Fly}$ coupled between node 222 and ground, and capacitor $\alpha_B{}^*C_{Fly}$ coupled between node 224 and ground.

Finally, output cell 208 includes transistor $M_{ParP}$ coupled between node 222 and output node 226, and transistor $M_{ParN}$ coupled between node 224 an output node 226. While driver circuit 200 includes several advantages, such as the use of low voltage transistors, it can be difficult to significantly increase the output voltage in some applications without suffering parasitic power dissipation losses due to the number of switching cells needed.

SUMMARY

According to an embodiment, a driver circuit comprises a series-parallel charge pump comprising a plurality of switched capacitor cells, wherein the series-parallel charge pump is configured for generating a plurality of coarse signal steps between a first output node and a second output node; a flying capacitor coupled between the first output node and the second output node; and a digital-to-analog converter (DAC) coupled between the first output node and the second output node comprising a plurality of switched capacitors configured for generating a plurality of fine signal steps.

According to an embodiment, a driver circuit comprises a series-parallel charge pump configured for generating a plurality of coarse signal steps; a digital-to-analog converter (DAC) coupled to the series-parallel charge pump comprising a plurality of switched capacitors; and a flying capacitor interposed between the series-parallel charge pump and the DAC, wherein the DAC is configured for generating a plurality of fine signal steps and for charging the plurality of switched capacitors only when a load is coupled to the driver circuit.

According to an embodiment, a driver circuit comprises a plurality of series-connected macro cells, wherein each macro cell comprises a plurality of up-converting cells for generating a plurality of coarse signal steps; and a plurality of down-converting cells for generating a plurality of fine signal steps by dividing each of the coarse signal steps.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
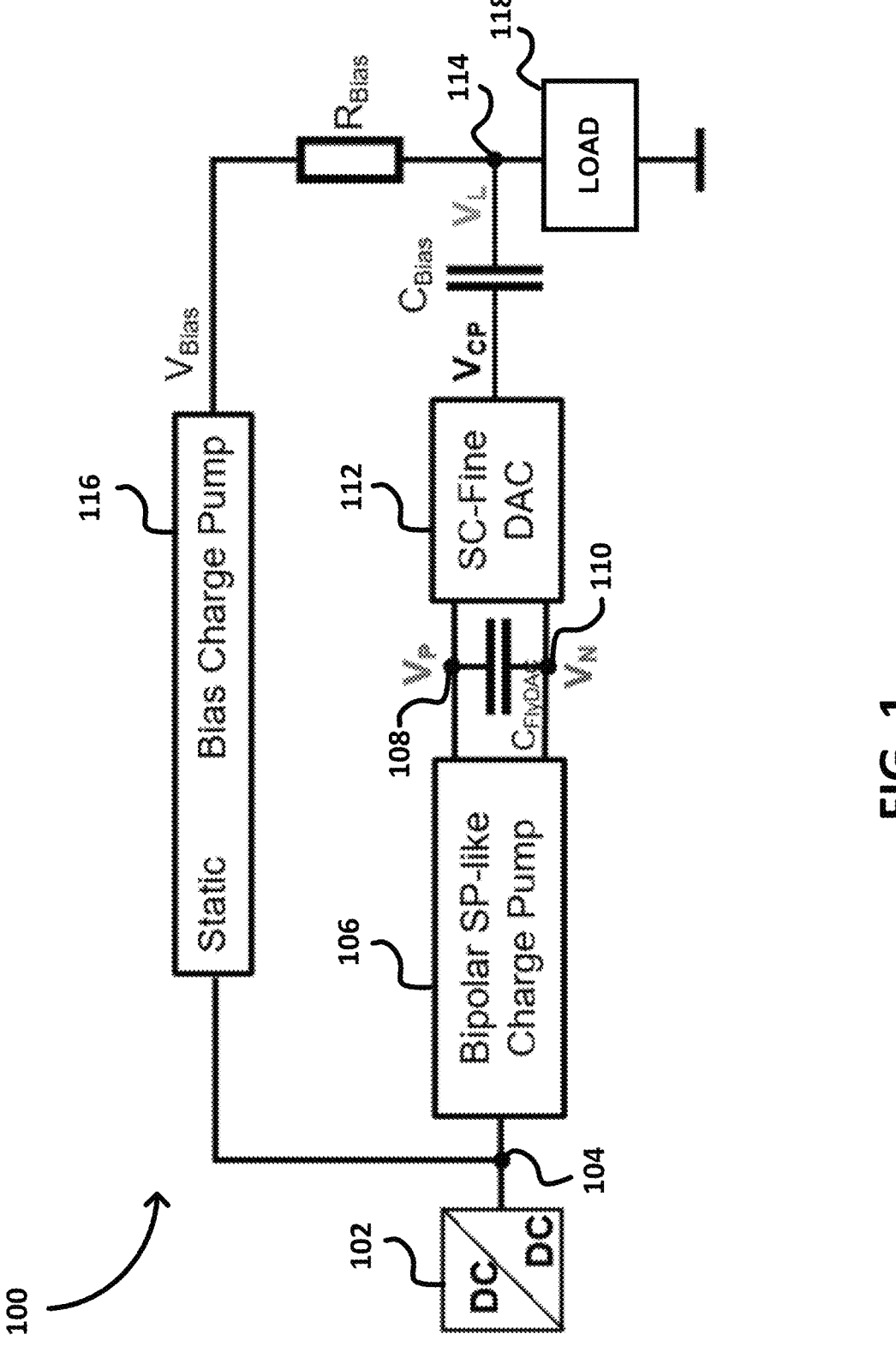
FIG. 1 is a block diagram of a load driver circuit according to an embodiment.
Figure 2:
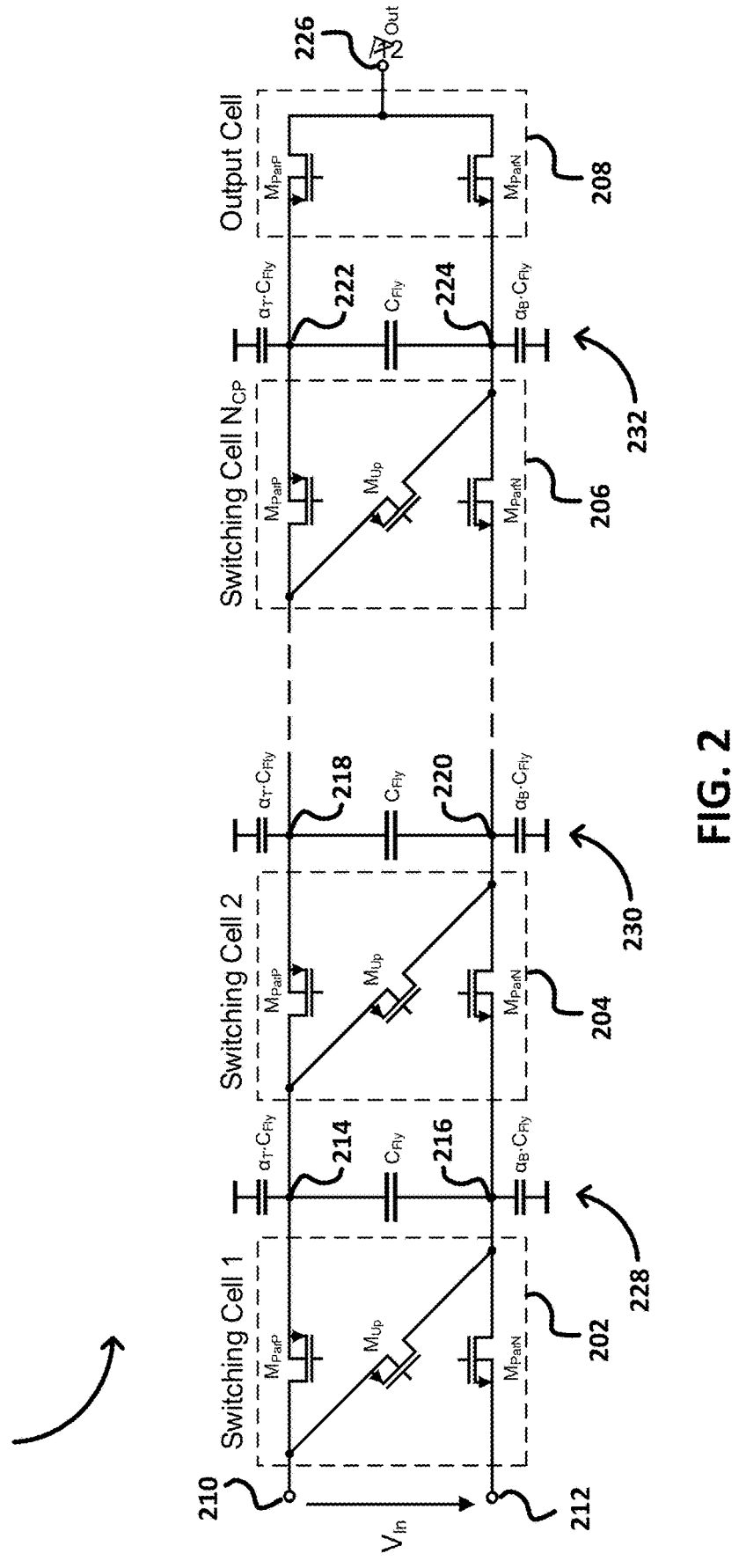
FIG. 2 is a schematic diagram of a prior art driver circuit.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In the following detailed description, reference is made to the accompanying drawings, which form a part hereof and in which are shown by way of illustrations specific embodiments in which the invention may be practiced. It is to be understood that other embodiments may be utilized and structural or logical changes may be made without departing from the scope of the present invention. For example, features illustrated or described for one embodiment can be used on or in conjunction with other embodiments to yield yet a further embodiment. It is intended that the present invention includes such modifications and variations. The examples are described using specific language, which should not be construed as limiting the scope of the appending claims. The drawings are not scaled and are for illustrative purposes only. For clarity, the same or similar elements have been designated by corresponding references in the different drawings if not stated otherwise.

According to embodiments, a wide-dynamic-range recuperating high-voltage-conversion-ratio integrated capacitive load driver generates periodic or arbitrary stepwise waveforms with dynamically configurable frequency, amplitude, phase, and waveform shape. According to embodiments, the load driver operates at audio, ultra-sonic or other operation frequencies and recuperates energy both at low as well as at high amplitudes, when modulating a capacitive load. Although embodiments of the present invention are well suited for driving a capacitive load, such as a MEMS speaker, other types of loads that are not MEMS devices, and that are not primarily capacitive can also be driven. In some embodiments, the load can be differential and be driven by two load drivers according to embodiments as is described in further detail later. According to embodiments the load driver comprises a unipolar or bipolar (non-inverting and inverting) charge pump based on configurable cap arrays, wherein flying capacitors operate in parallel-series configuration as a coarse step boost converter provides (unloaded) either positive multiples or both positive and negative multiples of input voltage at the output, and wherein floating supplies of integrated switches and their gate-drivers are supplied from flying capacitors referenced to parallel-series charge pump levels. According to embodiments, the load driver also comprises a fine-converter providing one or multiple intermediate voltage levels between the voltage levels at the last flying capacitor(s) terminals through a capacitive tank or capacitive divider referred to and supplied from same flying capacitor voltage (or voltages) in the coarse converter. The intermediate voltage levels are used to step through intermediate levels increasing the number of steps in the step-wise charging process beyond the number of coarse step range levels. These and other features of the load driver according to embodiments is described in further detail below.

The load driver circuit as described below is counter intuitive, since the fine-converter adds parasitic loading to the series-parallel charge pump. The series-parallel (SP) charge pump boost functionality is extremely sensitive on loading and parasitic capacitances and a capacitive divider network adds additional switching and parasitic capacitances losses loading the SP charge pump. In some prior art designs, voltage boost-functionality, voltage-conversion-ratio (VCR), and charge pump efficiency are affected by additional parasitic capacitance and losses. However, with the fine-converter circuits described below, according to embodiments, the reduction of dynamic losses outweighs additional losses. In addition, sub-regulation, which is described in detail below, but advantageously increases the charge pump efficiency and VCR ratio of the SP charge pump.

Thus, in embodiments, the flying capacitor and fine-converter are configured for generating a plurality of fine signal steps and are implemented such that the plurality of switched capacitors only are discharged and charged when a load is coupled to the driver circuit, otherwise dynamic losses are minimized. This is because the flying capacitor and fine-converter act as a buffer, and do not significantly load the SP charge pump when a load is not present.

FIG. 1 is a block diagram of a load driver circuit 100 according to an embodiment. Load driver circuit 100 comprises a bipolar series-parallel charge pump 106, which is further described below with respect to a charge pump circuit shown in FIG. 3. The bipolar series-parallel charge pump 106 has outputs coupled to a flying capacitor $C_{FlyDAC}$ at node 108 ($V_P$) and node 110 ($V_N$). A series-capacitor (SC) fine digital-to-analog converter (DAC) 112 has inputs coupled to nodes 108 and 110. DAC 112 is further described below with respect to DAC circuits shown in FIGS. 5-9. A bias capacitor $C_{BIAS}$ is coupled between the output of DAC 112 ($V_{CP}$) and node 114 ($V_L$). A load 118 is coupled to node 114. As previously noted, load 118 can comprise a capacitive load, but may include any load such as a resistive load or a sensor, for example. Load driver circuit 100 may also include a quasi-static high-impedance charge pump 116 coupled between node 104 and the $V_{BIAS}$ node. Charge pump 116 advantageously sets the $V_{BIAS}$ bias voltage independently from the AC excitation ($V_{CP}$). Any suitable low power charge pump may be used to implement charge pump 116 implemented with techniques such as reduced drive strength, switching frequencies, low quiescent currents, and efficient circuit topologies as are known in the art. Low power charge pumps typically dissipate power in the microwatt or single-digit milliwatt range. A bias resistor $R_{BIAS}$ is coupled between the $V_{BIAS}$ node and node 114. Finally, load driver circuit 100 can include an input DC-to-DC converter 102 for initial conditioning of an input voltage signal.

Figure 3:
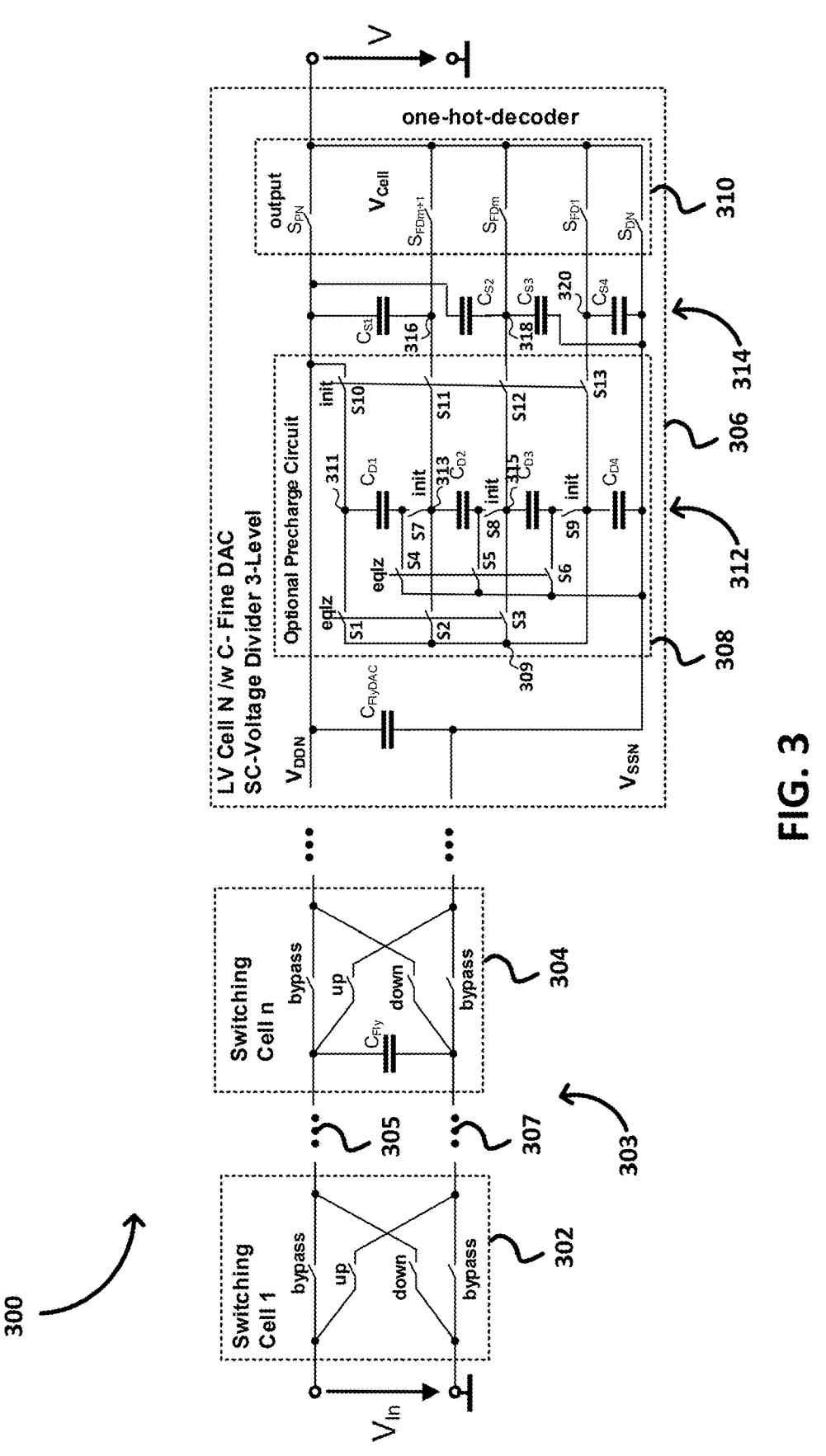
FIG. 3 is a schematic diagram of a load driver circuit, according to an embodiment.

FIG. 3 is a schematic diagram of a load driver circuit 300, according to an embodiment. Load driver circuit 300 is advantageously designed for driving loads, and capacitive loads in particular, and comprises a bipolar series-parallel charge pump 303 comprising a plurality of switched capacitor cells including at least switched capacitor cell 302 and switched capacitor cell 304, wherein the bipolar series-parallel charge pump 303 is configured for generating a plurality of coarse signal steps between a first output node $V_{DDN}$ and a second output node $V_{SSN}$. Load driver circuit 300 also comprises a flying capacitor $C_{FlyDAC}$ coupled between the first output node $V_{DDN}$ and the second output node $V_{SSN}$. Load driver circuit 300 further comprises a fine digital-to-analog converter (DAC) 306 coupled between the first output node $V_{DDN}$ and the second output node $V_{SSN}$ comprising a plurality of switched capacitors configured for generating a plurality of fine signal steps.

Bipolar series-parallel charge pump 303 comprises at least switched capacitor cell 302 and switched capacitor cell 304, although more switched capacitor cells can be used to develop a required charge pump output voltage at first output node $V_{DDN}$ and the second output node $V_{SSN}$. Switched capacitor cell 302 comprises a plurality of switches including a first BYPASS switch coupled between the $V_{In}$ input node and node 305, an UP switch coupled between the $V_{in}$ input node and node 307, a DOWN switch coupled between node 305 and ground, and a second BYPASS switch coupled between node 307 and ground. Switched capacitor cell 304 comprises the same plurality of switches including a first BYPASS switch coupled between node 305 and the first output node $V_{DDN}$, an UP switch coupled between node 305 and the second output node $V_{SSN}$, a DOWN switch coupled between node 307 and the first output node $V_{DDN}$, and a second BYPASS switch coupled between node 307 and the second output node $V_{SSN}$. Switched capacitor cell 304 also includes a capacitor $C_{Fly}$ coupled between node 305 and node 307. Additional capacitor cells, if used, will also include a capacitor $C_{Fly}$ as shown in FIG. 3. In FIG. 3 the $V_{In}$ voltage will be powered by a constant battery voltage or output voltage of a sub-regulator or power-converter. The constant battery voltage has a minimum voltage of about one or more volts, or other minimum voltage value determined by the semiconductor process used. Otherwise, the constant battery voltage is determined by the amplitude of the $V_{DDN}$ and $V_{SSN}$ voltages desired, and the number of switched capacitor cells used. The $V_{Out}$ output is an arbitrary analog stepwise waveform generated by a variation of a number and timing of individual coarse and fine steps as described herein. In embodiments, the generated output signal comprises or is related to analog audio, speech, or music signals to drive a MEMS device such as a direct-drive, parametric, or pumping MEMS speaker. Other MEMS and non-MEMS loads can also be driven.

The output of bipolar series-parallel charge pump 303 is coupled to a flying capacitor CFlyDAC at first output node VDDN and second output node VSSN. Flying capacitor CFlyDAC is part of a fine DAC, or is a standalone component in some embodiments. Fine DAC 306 is described in further detail below.

The fine DAC 306 also includes an optional precharge circuit 308 and a decoder circuit 310 for supplying the $V_{Out}$ output signal described below. The fine DAC 306 also includes a three level switched-capacitor voltage divider 314 that is also described below. Voltage divider 314 can comprise fewer or additional levels in other embodiments.

Optional precharge circuit 308 includes switches S1, S2, S3, S4, S5, S6, S7, S8, S9, S10, S11, S12, and S13, as well as capacitors $C_{D1}$, $C_{D2}$, $C_{D3}$, and $C_{D4}$. Capacitors $C_{D1}$, $C_{D2}$, $C_{D3}$, and $C_{D4}$ are in series connection forming a voltage divider 312. The control nodes of switches S1, S2, S3, S4, S5 and S6 are controlled by an EQLZ equalization signal. The control nodes of switches S7, S8, S9, S10, S11, S12, and S13 are controlled by an INIT initialization signal. In the example of FIG. 3, switch S1 is coupled between node 309 and node 311, switch S2 is coupled between node 309 and node 313, and switch S3 is coupled between node 309 and node 315. Optional precharge circuit 308 also includes capacitor $C_{D1}$ and switch S7 serially coupled between node 311 and node 313, capacitor $C_{D2}$ and switch S8 serially coupled between node 313 and node 315, capacitor $C_{D3}$ and switch S9 serially coupled between node 315 and node 309, and capacitor $C_{D4}$ coupled between node 309 and the second output node $V_{SSN}$. Switch S4 is coupled between the second output node $V_{SSN}$ and the junction between capacitor $C_{D1}$ and switch S7, switch S5 is coupled between the second output node $V_{SSN}$ and the junction between capacitor $C_{D2}$ and switch S8, and switch S6 is coupled between the second output node $V_{SSN}$ and the junction between capacitor $C_{D3}$ and switch S9. Switch S10 is coupled between node 311 and the first output node $V_{DDN}$, switch S11 is coupled between node 313 and node 316, switch S12 is coupled between node 315 and node 318, and switch S13 is coupled between node 309 and node 320.

The timing of and between the EQLZ and INIT control signals is described below. For initialization or refresh the capacitive divider 312 can be charged initially or repeatedly by connecting the capacitive divider $C_{D1}$ $C_{D2}$, $C_{D3}$, $C_{D4}$ in parallel to the flying supply $C_{FlyDAC}$ and periodically intermediate mutually exclusive equalization phases can be used to equalize and balance levels of the DAC 306. Phases of the EQLZ and INIT signals alternate as required for initialization and refresh.

Voltage divider 314 comprises capacitor $C_{S1}$ coupled between the first output node $V_{DDN}$ and node 316, capacitor $C_{S2}$ coupled between the first output node $V_{DDN}$ and node 318, capacitor $C_{S3}$ coupled between the second output node $V_{SSN}$ and node 318, and capacitor $C_{S4}$ coupled between the second output node $V_{SSN}$ and node 320.

In operation, each of capacitors $C_{D1}$, $C_{D2}$, $C_{D3}$, and $C_{D4}$ have equal values in some embodiments. Also each of capacitors $C_{S1}$, $C_{S2}$, $C_{S3}$, and $C_{S4}$ also have equal values in some embodiments. In the example of FIG. 3, the voltage at node 316 is ¾ of the value of ($V_{DDN}$–$V_{SSN}$), the voltage at node 318 is ½ of the value of ($V_{DDN}$–$V_{SSN}$), and the voltage at node 320 is ¼ of the value of ($V_{DDN}$–$V_{SSN}$), all referenced to the $V_{SSN}$ voltage.

Fine DAC 306 also includes a decoder 310 including switch $S_{PN}$ coupled between the first output node $V_{DDN}$ and the $V_{Out}$ output voltage node of fine DAC 306, switch $F_{Dm+1}$ coupled between node 316 and the $V_{Out}$ output voltage node of fine DAC 306, switch $F_{Dm}$ coupled between node 318 and the $V_{Out}$ output voltage node of fine DAC 306, switch $F_{D1}$ coupled between node 320 and the $V_{Out}$ output voltage node of fine DAC 306, and switch $F_{DN}$ coupled between the second output node $V_{SSN}$ and the $V_{Out}$ output voltage node of fine DAC 306. In fine DAC 306, according to embodiment, decoder 310 comprises a one-hot decoder.

In operation, one of the switches in decoder 310 selectively transfers the $V_{DDN}$ voltage, the $V_{SSN}$ voltage, or the voltage divider voltages to the output of the fine DAC under control of a plurality of control signals (not shown in FIG. 3) in order to construct the desired output voltage transient to drive a capacitive load, or other type of load.

Figure 4:
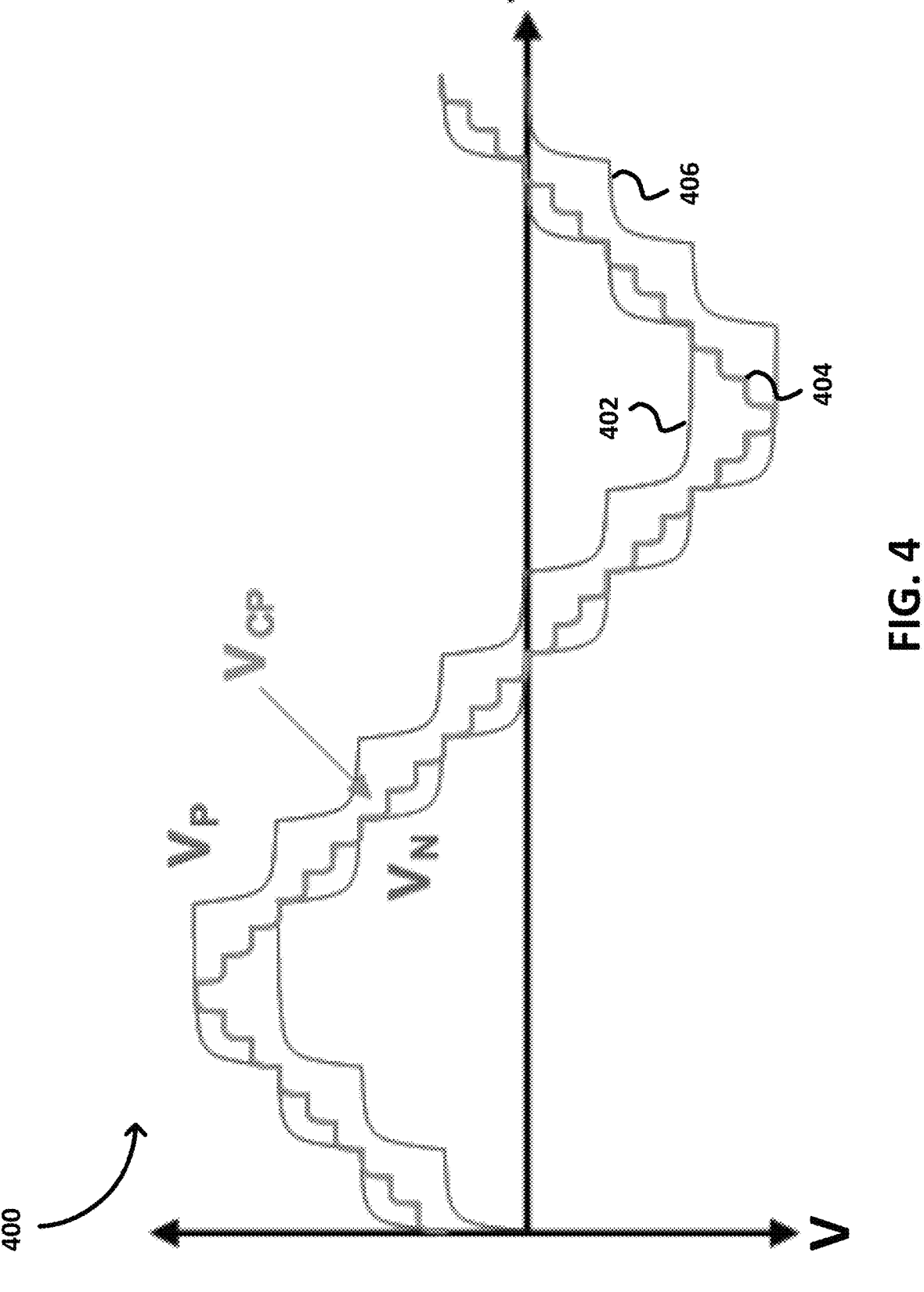
FIG. 4 is a timing diagram of the load driver circuit of FIG. 3.

FIG. 4 is a timing diagram 400 of the load driver circuit of FIG. 3. In the timing diagram 400, the X-axis is time and the Y-axis is voltage. The following voltage waveforms are shown in FIG. 4: waveform VP 402 is the "top" voltage of capacitor $C_{FlyDAC}$ and corresponds to the $V_{DDN}$ voltage shown in FIG. 3, waveform $V_N$ 406 is the "bottom" voltage of capacitor $C_{FlyDAC}$ and corresponds to the $V_{SSN}$ voltage shown in FIG. 3, and waveform $V_{CP}$ 404 is the output voltage of the fine DAC 306 shown in FIG. 3, and corresponds to the $V_{Out}$ voltage shown in FIG. 3. It can be seen in the timing diagram 400 of FIG. 4 that the $V_P$ and $V_N$ voltage waveforms are coarse representations of the input voltage $V_{In}$, with a discrete number of coarse voltage levels. Timing diagram 400 of FIG. 4 also shows that the $V_{CP}$ waveform provides a more accurate representation of the input voltage $V_{In}$, with an additional number of fine voltage levels. In an embodiment, each coarse voltage level is divided into an equal integer number of fine voltage levels by the operation of fine DAC 306. During operation all fine DAC levels can be allowed or in some embodiments restricted and omitted. In the example of FIG. 4, each coarse voltage step is divided into three equal fine voltage steps. In other embodiments, fewer or additional fine voltage steps can be used for each coarse voltage step. In some embodiments, the fine voltage steps need not be exactly equal.

The control signals for the UP, DOWN, and BYPASS switches shown in FIG. 3, and the generation of the coarse voltage with respect to the input signal are described below. For generation of the positive rising slope of the triangular wave depicted in FIG. 4, the BYPASS switches sequentially open, while the corresponding UP switches close (in each of the SP charge-pump stages), until the maximum amplitude is reached. The process is then reversed, and the UP switches are opened, while corresponding BYPASS switches are closed until the intermediate level is reached again and all BYPASS switches are closed, and all flying capacitors $C_{Fly}$ and $C_{FlyDAC}$ are recharged again. Then, the process repeats to generate the negative half wave and the bypass switches are sequentially opened, while corresponding DOWN switches are closed, until the maximum negative amplitude is reached. The process is reversed again and the DOWN switches are opened, while corresponding BYPASS switches are closed until the intermediate level is reached again. Thus, with "N" stages 2N+1 coarse levels are generated and the minimum step size becomes the peak-to-peak amplitude divided by 2N, which is twice the number of charge pump stages.

Figure 5A:
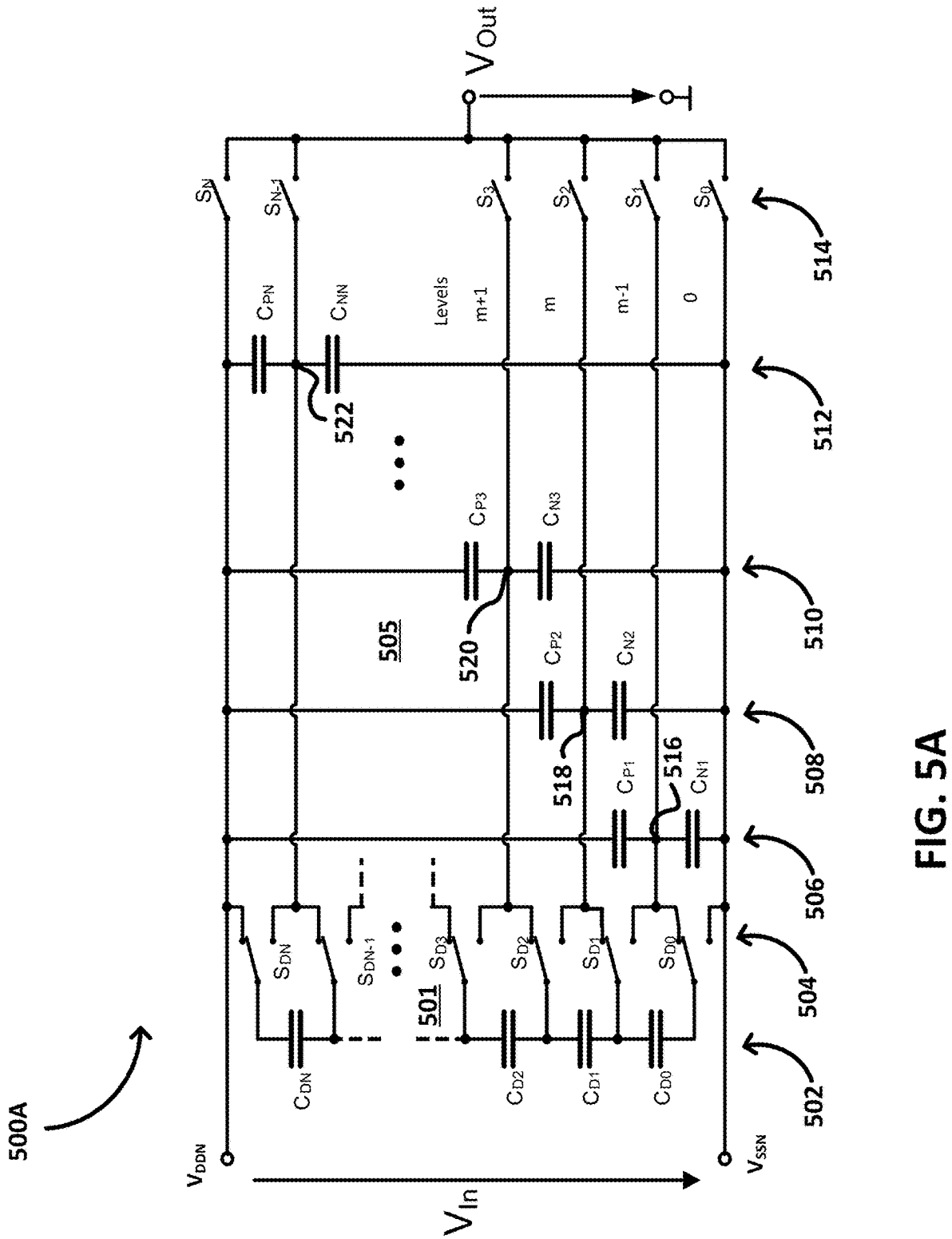
FIG. 5A is a schematic diagram of a fine DAC according to another embodiment.

FIG. 5A is a schematic diagram of a fine DAC 500A according to another embodiment. Fine DAC 500A comprises an energy storage capacitor array 505 including capacitor dividers 506 (capacitor $C_{P1}$ and capacitor $C_{N1}$), 508 (capacitor $C_{P2}$ and capacitor $C_{N2}$), 510 (capacitor $C_{P3}$ and capacitor $C_{N3}$) and 512 (capacitor $C_{PN}$ and $C_{NN}$) respectively configured for providing a plurality of intermediate voltages 516, 518, 520, and 522 between the first output node voltage VDDN and a second output node voltage VSSN. While four capacitor dividers are shown in the schematic diagram of FIG. 5A, additional or fewer capacitor dividers can be used in other embodiments. Fine DAC 500A also includes a switch array 514 comprising parallel switches $S_0$, $S_1$, $S_2$, $S_3$, $S_{N-1}$, and $S_N$ configured for selectively coupling the plurality of intermediate voltages 516, 518, 520, and 522 to the VOut output of the DAC. In some embodiments "N" is an integer greater or equal to three.

Fine DAC 500A optionally further comprises a refresh and initialization circuit 501 coupled to the first output node VDDN and the second output node VSSN, and coupled to the energy storage capacitor array 505. Refresh and initialization circuit 501 comprises capacitor divider 502 including serial coupled capacitors $C_{D0}$, $C_{D1}$, $C_{D2}$, $C_{DN}$. In turn, capacitor divider 502 is coupled to a switch array 504 including switches $S_{D0}$, $S_{D1}$, $S_{D2}$, $S_{D3}$, $S_{DN-1}$, and $S_{DN}$. While four capacitors are shown in capacitor divider 502, and six switches are shown in switch array 504, it will be apparent to those skilled in the art that additional or fewer components will be used commensurate with the number of intermediate voltages used in other embodiments.

In operation, as capacitor $C_{Dm}$ pins, wherein $C_{Dm}$ corresponds to capacitors $C_{D0}$, $C_{D1}$, $C_{D2}$, $C_{DN}$, are repeatedly connected to adjacent levels between m−1 and m and between m and m+1 of the energy storage capacitor array 505, the voltage difference between adjacent levels m−1, m, and m+1 are equalized. Therefore all intermediate levels will settle to voltage levels distributed between $V_{DDN}$ or $V_{SSN}$ during refresh and initialization cycles.

Figure 5B:
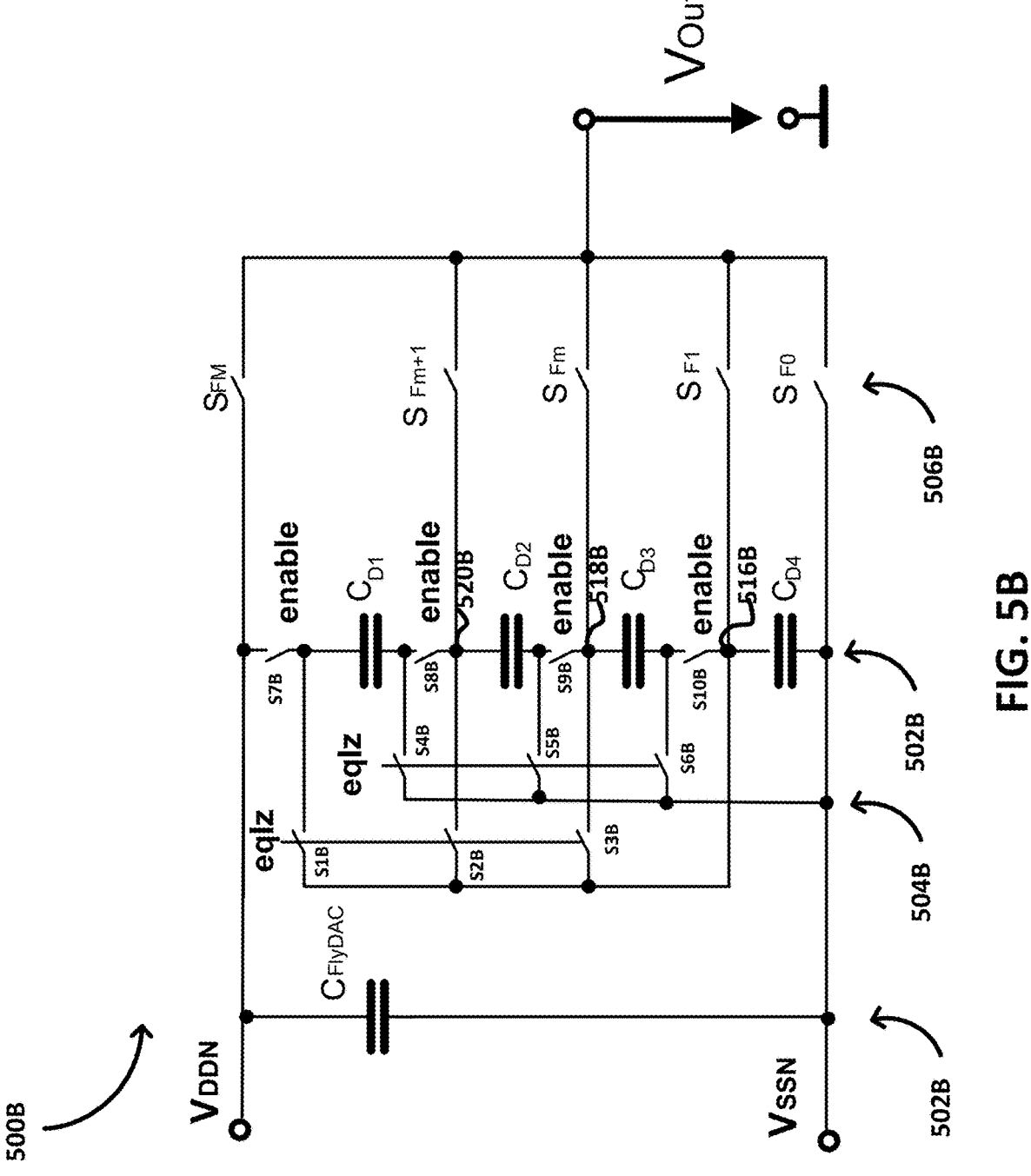
FIG. 5B is a schematic diagram of a fine DAC according to another embodiment.

FIG. 5B is a schematic diagram of a fine DAC 500B according to another embodiment. Fine DAC 500B comprises a combined energy storage and capacitive divider array 502B configured for providing a plurality of intermediate voltages 516B, 518B, and 520B between the first output node voltage $V_{DDN}$ and the second output node voltage $V_{SSN}$. The combined energy storage and capacitive divider array 502B includes flying capacitor $C_{FlyDAC}$ and a capacitor divider including capacitors $C_{D1}$, $C_{D2}$, $C_{D3}$, and $C_{D4}$ serially coupled together with switches $S_{7B}$, $S_{8B}$, $S_{9B}$, and $S_{10B}$. Fine DAC 500B also comprises a switch array 506B configured for selectively coupling the plurality of intermediate voltages 516B, 518B, and 520B as well as VDDN and VSSN to the output $V_{Out}$. Switch array comprises a plurality of parallel switches $S_{F0}$, $S_{F1}$, $S_{Fm}$, $S_{Fm+1}$, and $S_{FM}$. The number of switches, as well as the number of capacitor divider capacitors, can be reduced or increased in other embodiments. Fine DAC 500B optionally further comprises a refresh and initialization circuit 504B coupled to the combined energy storage and capacitive divider array 502B. The refresh and initialization circuit 504B comprises enable switches $S_{1B}$, $S_{2B}$, $S_{3B}$, $S_{4B}$, $S_{5B}$, and $S_{6B}$, wherein the control node of each of the switches is coupled to an EQLZ equalization control signal.

In operation, the combined energy storage and capacitive divider array 502B operates as energy storage cap array when the enable switches are closed. The combined energy storage and capacitive divider array 502B provides intermediate voltages levels between $V_{DDN}$ and $V_{SSN}$ through a series connected capacitor array configuration between $V_{DDN}$ or $V_{SSN}$. The same array also forms, for refresh and initialization, a capacitive divider network providing intermediate voltages by division of the $V_{DDN}$–$V_{SSN}$ difference voltage. The voltages across the capacitive divider capacitors can be equalized when the enable switches are closed. An analog multiplexer or switch array 506B is used to connect the intermediate voltage levels, as well as the $V_{DDN}$ and $V_{SSN}$ voltages, to the output node $V_{Out}$.

Figure 5C:
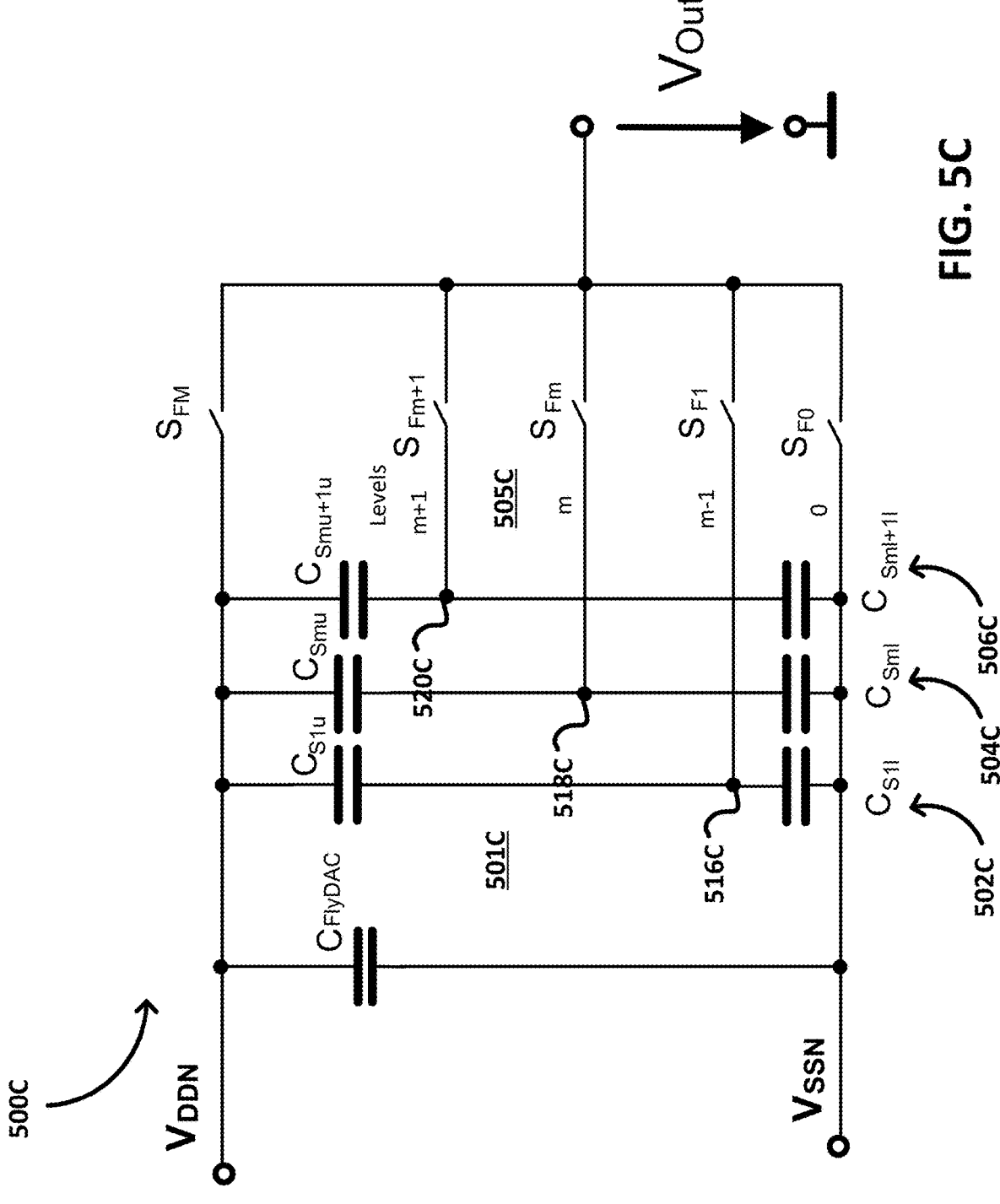
FIG. 5C is a schematic diagram of a fine DAC according to another embodiment.

FIG. 5C is a schematic diagram of a fine DAC 500C according to another embodiment, which is similar to the fine DAC 500A previously described with respect to FIG. 5A, except that the refresh and initialization circuit 501 is omitted. In pertinent part, fine DAC 500C comprises an energy storage capacitor array 501C coupled to a switch array 505C. Energy storage capacitor array 501C comprises a flying capacitor $C_{FlyDAC}$ and a plurality of capacitor dividers 502C (capacitor $C_{S1u}$ and capacitor $C_{S1l}$), 504C (capacitor $C_{Smu}$ and capacitor $C_{Sml}$), and 506C (capacitor $C_{Smu+1u}$ and capacitor $C_{Sml+1l}$) for respectively generating intermediate voltages at nodes 516C, 518C, and 520C. Switch array comprises a plurality of switches coupled to the energy storage capacitor array 501C and includes switches $S_{F0}$, $S_{F1}$, $S_{Fm}$, $S_{Fm+1}$, and $S_{FM}$. The exact number of capacitor dividers and switches in the switch array can be increased or decreased in different embodiments.

In operation, the energy storage capacitor array 501C provides "M" intermediate voltages levels between $V_{DDN}$ and $V_{SSN}$ for "M" DAC cells. At least one pin of the capacitor in energy storage capacitor array 501C is coupled to either $V_{DDN}$ or $V_{SSN}$, or in other words, split into upper ($C_{S1u}$, $C_{Smu}$, and $C_{Smu+1u}$) and lower ($C_{S1l}$, $C_{Slu}$, and $C_{Sml+1l}$) capacitors arrays. An analog multiplexer or switch array 505C couples the intermediate voltage levels as well as $V_{DDN}$ and $V_{SSN}$ to the output node $V_{Out}$. The refresh and initialization circuit (shown in FIG. 5A) can be removed in the embodiment of FIG. 5C to minimizes parasitic bulk capacitances and enhance efficiency. If an initial settling over several modulation cycles is acceptable, the fine-DAC intermediate levels will self-settle with periodic switching sequence for continuous DC/AC modulation. Settling can be reduced by adjusting the ratio of the upper and lower capacitors of the energy storage capacitor array 501C to form capacitive dividers reflecting the settled values when the fine DAC 500C voltage supply is ramped up. In one example, for three levels the ratio of $C_{S1u}/C_{S1l}$ can be ⅓, the ratio of $C_{S2u}/C_{S2l}$ can be one, and the ratio for $C_{S3u}/C_{S3l}$ can be three, yielding levels of ¼, ½, and ¾ of the $V_{DDN}$–$V_{SSN}$ voltage difference.

Figure 5D:
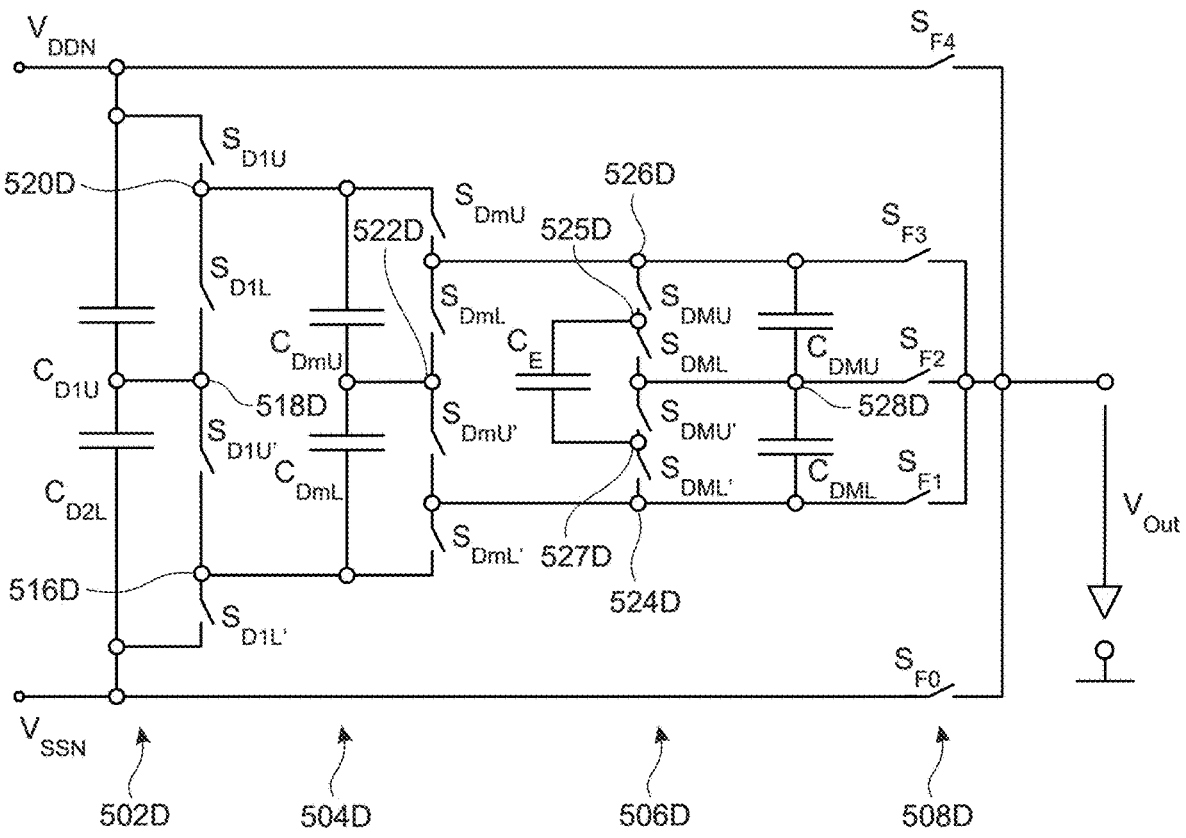
FIG. 5D is a schematic diagram of a fine DAC according to another embodiment.

FIG. 5D is a schematic diagram of a fine DAC 500D according to another embodiment. Fine DAC 500D comprises a plurality of serially coupled unit cells 502D, 504D, and 506D configured to implement a binary weighted sum of shifted input voltage fractions, wherein each unit cell comprises of a pair of serially-coupled capacitors and two pairs of switches coupled to the pair of serially-coupled capacitors. Unit cell 502D comprises capacitors $C_{D1U}$ and $C_{D1L}$, a first pair of switches including switch $S_{D1U}$ and $S_{D1L}$, and a second pair of switches $S_{D1U'}$ and $S_{D1L'}$. Unit cell 504D comprises capacitors $C_{DmU}$ and $C_{DmL}$, a first pair of switches including switch $S_{DmU}$ and $S_{DmL}$, and a second pair of switches $S_{DmU'}$ and $S_{DmL'}$. Fine DAC 500D also includes a multiplexer coupled to unit cell 506D comprising switches $S_{F0}$, $S_{F1}$, $S_{F2}$, $S_{F3}$, and $S_{F4}$. Fine DAC 500D optionally further comprising a balancing capacitor $C_E$ coupled to unit cell 506D. Specifically, capacitor CE is coupled between node 525D (junction between switches $S_{DMU}$ and $S_{DML}$) and node 527D (junction between switches $S_{DMU'}$ and $S_{DML'}$).

In operation, fine DAC 500D is a binary adder based fine DAC comprising "M" stages of unit cells that implement a binary weighted sum of shifted input voltage fractions. In the example of FIG. 5D, "M" is an integer equal to three. However "M" can assume other integer values. As previously described, each unit cell comprises two capacitors $C_{DmU}$ and $C_{DmL}$ forming a binary capacitive voltage divider. The capacitor voltage dividers of used to halve the input voltage. Two pairs of switches ($S_{FMU}$ and $S_{FML}$, and $S_{FMU'}$ and $S_{FML'}$) couple a following unit cell "(m+1)" input to the outputs of the "m" prior unit cell. Each unit cell outputs the input voltage's upper half of the when switches $S_{DmU}$ and $S_{DmU'}$ are enabled, and outputs the input voltage's lower half, when switches $S_{DmL}$ and $S_{DmL'}$ are enabled. The last stage "M" is coupled to a multiplexer including at least switches $S_{F1}$, $S_{F2}$, and $S_{F3}$ to connect the upper, middle or lower output of the last capacitive divider to the load at the $V_{Out}$ node. Balancing capacitor $C_E$ is coupled to the output of the last "M" unit cell, to balance the voltages across each of the capacitors $C_{DMU}$ and $C_{DML}$. With each additional unit cell, the number of intermediate voltage levels is more than doubled: "2M–1" unit cells provides =>F=1, 3, 7, 15, . . . intermediate levels. In the embodiment shown in FIG. 5D, the capacitor voltages of the unit cells up to the "M–1" are self-balancing and generally do not require an additional balancing capacitor. Switches $S_{F0}$ and $S_{F4}$ are optionally used to bypass fine DAC 500D.

Figure 5E:
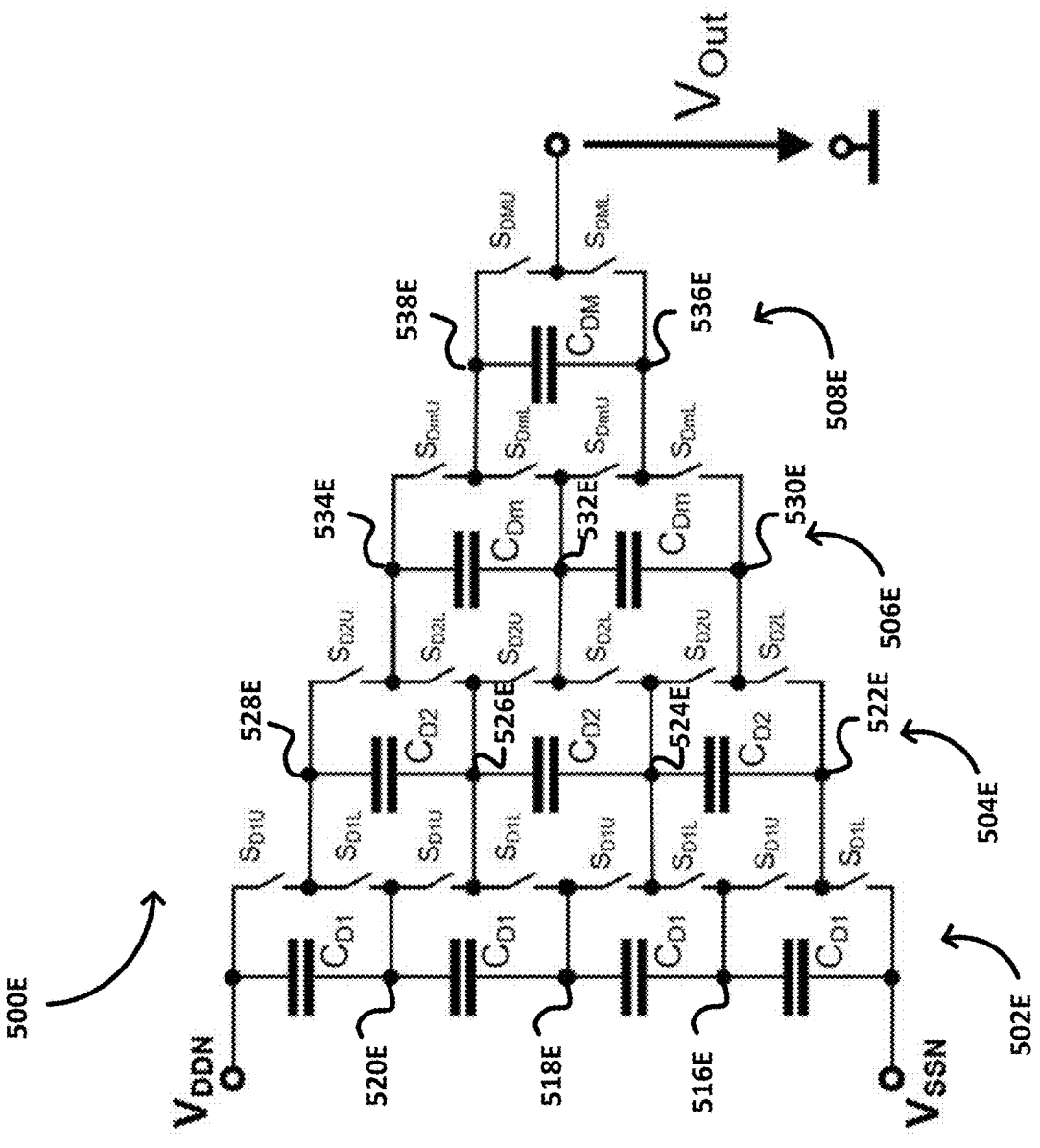
FIG. 5E is a schematic diagram of a fine DAC according to another embodiment.

FIG. 5E is a schematic diagram of a fine DAC 500E according to another embodiment. Fine DAC 500E comprises a plurality of unit cells 502E, 504E, 506E, 508E wherein each unit cell comprises a plurality of serially-coupled capacitor strings, wherein each capacitor string comprises one or more capacitors; and a pair of switches coupled to each capacitor in the DAC, wherein a first capacitor string comprises "M" serial-coupled capacitors, wherein "M" is an integer greater than one, and a last capacitor string comprises a single capacitor.

A capacitor string in unit cell 502E comprises four $C_{D1}$ capacitors serially coupled between $V_{DDN}$ and $V_{SSN}$, and including intermediate nodes 516E, 518E, and 520E between the $C_{D1}$ capacitors. Also in the capacitor string of unit cell 502E a first set of serially-coupled switches $S_{D1U}$ and $S_{D1L}$ is coupled across a first $C_{D1}$ capacitor, a second set or serially-coupled switches $S_{D1U}$ and $S_{D1L}$ is coupled across a second $C_{D1}$ capacitor, a third set of serially-coupled switches $S_{D1U}$ and $S_{D1L}$ is coupled across a third $C_{D1}$ capacitor, and a fourth set of serially-coupled switches $S_{D1U}$ and $S_{D1L}$ is coupled across a fourth $C_{D1}$ capacitor.

A capacitor string of unit cell 504E comprises three $C_{D2}$ capacitors serially coupled between nodes 528E and 522E, and including intermediate nodes 524E and 526E between the $C_{D2}$ capacitors. Also in capacitor string of unit cell 504E a first set of serially-coupled switches $S_{D2U}$ and $S_{D2L}$ is coupled across a first $C_{D2}$ capacitor, and a second set or serially-coupled switches $S_{D2U}$ and $S_{D2L}$ is coupled across a second $C_{D2}$ capacitor, a third set of serially-coupled switches $S_{D2U}$ and $S_{D2L}$ is coupled across a third $C_{D2}$ capacitor.

A capacitor string of unit cell 506E comprises two $C_{Dm}$ capacitors serially coupled between nodes 530E and 534E, and including an intermediate nodes 532E between the $C_{Dm}$ capacitors. Also in capacitor string of unit cell 506E a first set of serially-coupled switches $S_{DmU}$ and $S_{DmL}$ is coupled across a first $C_{D2}$ capacitor, and a second set or serially-coupled switches $S_{DmU}$ and $S_{DmL}$ is coupled across a second $C_{D2}$ capacitor. A capacitor string of unit cell 508E comprises a single $C_{DM}$ capacitor coupled between nodes 538E and 536E. A set of serially-coupled switches $S_{DMU}$ and $S_{DML}$ is coupled across the $C_{DM}$ capacitor. The junction between the $S_{DMU}$ and $S_{DML}$ switches is the $V_{Out}$ node. The number of capacitors in each successive unit cell between the first capacitor string in unit cell 502E and the last capacitor string of unit cell 508E decreases by one capacitor. In the embodiment of FIG. 5E, therefore, the serially-coupled capacitor strings in each unit cell decreases from four capacitors, to three capacitors, to two capacitors, and then to a single capacitor. In other embodiments different numbers of unit cells can be used to provide different numbers of fine voltage levels at the $V_{Out}$ output node.

In operation, when switch $S_{Dm}U$ is enabled, switch $S_{D}mL$ is disabled and vice versa, and the successive stage is coupled to upper or lower capacitors of the prior capacitor string. With each additional string of capacitors and switch pairs (unit cell), the number of voltage levels is increased by one (F=M−1). In the fine DAC 500E of FIG. 5E, the capacitor voltages are self-balancing. All capacitors have the same voltage=$(V_{DDN}-V_{SSN})$/M, wherein "M"=the number of unit cells. Every unit cell (except for the final unit cell) can shift the successive unit cells up or down by one voltage level, and by adjusting the shifting of every unit cell, the output voltage VOut assumes one of the "N" voltage levels between $V_{DDN}$ and $V_{SSN}$.

Figure 5F:
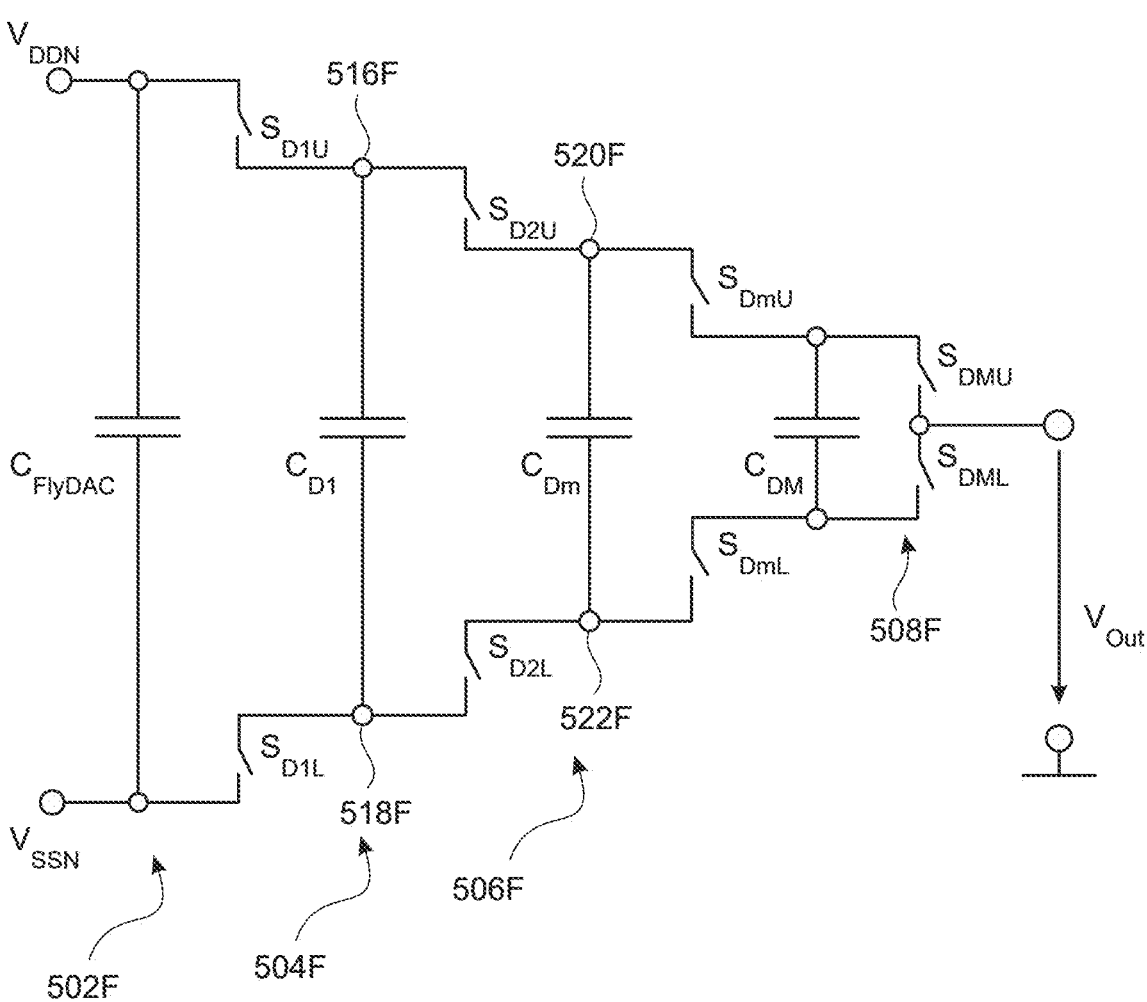
FIG. 5F is a schematic diagram of a fine DAC according to another embodiment.

FIG. 5F is a schematic diagram of a fine DAC 500F according to another embodiment. Fine DAC 500F comprises a plurality of unit cells 502F, 504F, 506F, and 508F. In an embodiment, each of the unit cells comprises a capacitor; and a half switch coupled to the capacitor, wherein the half switch is configured for selectively coupling a unit cell to a next unit cell of the plurality of unit cells.

Thus, unit cell 502F comprises capacitor $C_{FlyDAC}$ coupled to a half switches including switch $S_{D1U}$ (upper switch) and switch $S_{D1L}$ (lower switch). Unit cell 504F comprises capacitor $C_{D1}$ coupled to a half switches including switch $S_{D2U}$ and switch $S_{D2L}$. Unit cell 506F comprises capacitor $C_{Dm}$ coupled to a half-switches including switch $S_{DmU}$ and switch $S_{DmL}$. Unit cell 508F comprises capacitor $C_{DM}$ coupled to a half-bridge switch including switch $S_{DMU}$ and switch $S_{DML}$. The junction between the switches in unit cell 508F is coupled to the output voltage node $V_{Out}$. While four unit cells are shown in FIG. 5F, it will be apparent to those skilled in the art that a different number of unit cells can be used in different embodiments. In FIG. 5F, the flying capacitor CFlyDAC is shown as part of fine DAC 500F, and not specifically shown as separate from the fine DAC as is shown, for example, in FIG. 1 and in FIG. 3.

In operation, fine DAC 500F implements a Flying Capacitor Multilevel Inverter (FCMLI) or Capacitor-Clamped Multi-Level Inverter based fine DAC 500F. Fine DAC 500F is a string of pairs of switches with capacitors in-between the pairs, wherein "M" stages of unit cells implement a weighted sum of a step-size scaled input voltage difference. Each unit cell is charged to a fraction of the input voltage m*$(V_{DDN}-V_{SSN})$/M by the half bridge in each unit cell comprising the two switches $S_{DmU}$ and $S_{DmL}$. The half bridge couples either the upper or lower capacitor pin and potential to the next successive unit cell. By adjusting the switching pattern, different capacitors are configured to be floating or in series, thereby ignoring, adding, or subtracting the capacitor voltages from the $V_{DDN}$ or $V_{SSN}$ voltage. With each additional switch pair and capacitor (unit cell), the number of fine DAC voltage levels is increased by one (=M−1). In some embodiments, capacitor voltages are balanced actively by alternating between redundant switch configurations so that the capacitors are charged and discharged.

Figure 6A:
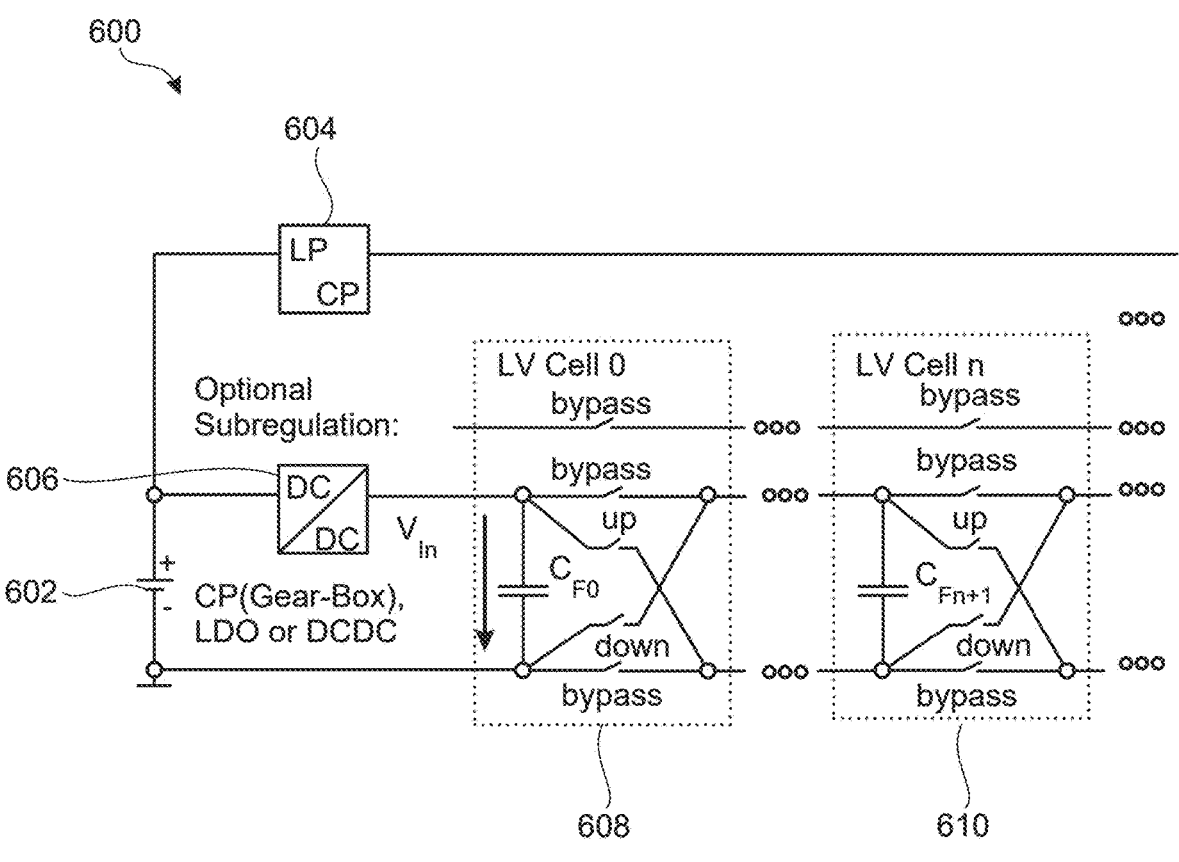
FIG. 6A and FIG. 6B taken together show a schematic diagram of a system including a load driver circuit, according to an embodiment.
Figure 6B:
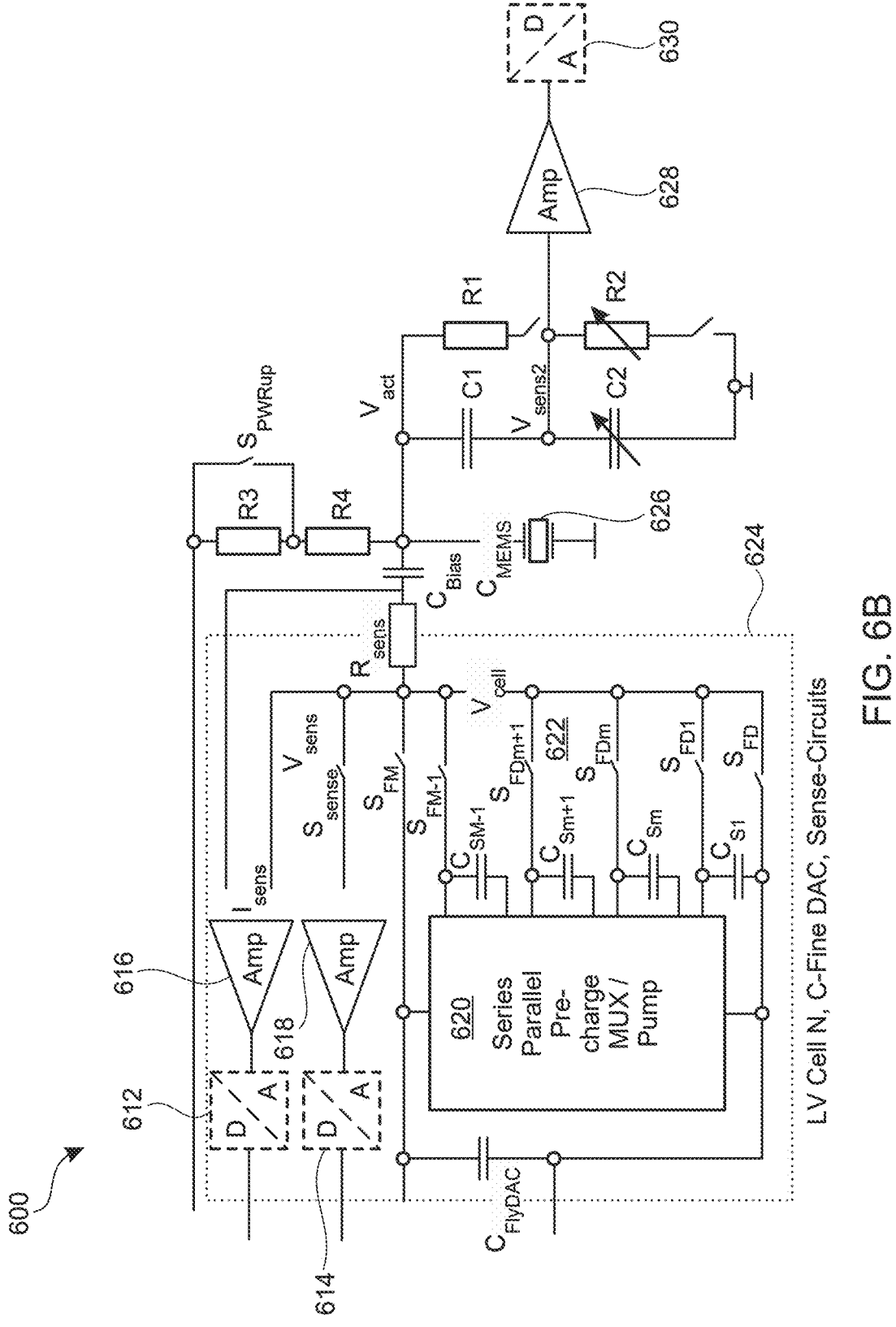

The application scope of the load driver circuit described herein can be extended by additional system aspects, according to an embodiment. FIG. 6A and FIG. 6B taken together show a schematic diagram of a system 600 including a load driver circuit, such as load driver circuit 300 shown in FIG. 3, as well as additional system circuits that are described in further detail below.

System 600, in pertinent part, includes a load driver circuit of the type previously described including a series-parallel charge pump including capacitor and switching cells 608 and 610, flying capacitor CN, a pre-charge circuit 620, and a capacitor and switch array 622, which are shown inside of the LV Cell, C-Fine DAC, and Sense-Circuits block 624. System 600 also shows a capacitive load 626, which can comprise a MEMS device CMEMS, which is driven by the load driver circuit. System 600 also shows a voltage input source 602. Other types of loads can also be used in system 600 shown in FIG. 6A and FIG. 6B.

System 600 optionally includes a sub-regulation circuit 606 for sub-regulating the input voltage provided by voltage input source 602. In some embodiments sub-regulation circuit 606 comprises a "gear-box" charge pump (that includes a so-called "gear-box" that combines two or more different converter topologies in conjunction with a topology switching scheme), an inductive buck-boost-converter, a low dropout (LDO) voltage converter, a DC to DC converter, or any other suitable voltage converter. Sub-regulating the input voltage with sub-regulation circuit 606 advantageously allows the use of low-voltage devices in the load driver circuit with lower drain-to-source "on" resistance ($R_{DSon}$) and lower switching power ($P_{SW}$). Sub-regulation circuit 606 also allows more series-parallel charge pump stages to be used, resulting in a lower power consumption due smaller coarse steps and therefore more steps to reach the same output voltage and reduced reasonable supply variation. In some embodiments, an indirect measurement of supply current can be made by a measurement of the current provided by the series-parallel charge pump (SP-CP).

System 600 optionally includes a crossover circuit including low-power charge pump 604, resistor divider $R_3$ and $R_4$, switch $S_{PWRup}$, as well as bias capacitor $C_{bias}$. In operation, the cross-over circuit provides an independent setting of quasi-static MEMS actuator bias and AC-excitation enabling. The cross-over circuit has low quiescent power consumption as only static high-voltage needs to be provided to voltage divider R3 and R4 and low-power charge pump 604 can have high-output resistance. The crossover circuit enables power efficient AC-modulation of the series-parallel charge-pump around battery level. The crossover circuit advantageously regulates the MEMS bias to a maximum sensitivity, for example during lower lsb-level (least significant bit) playback, which yields higher MEMS sensitivity (~+5 dB) when compared to omitting the crossover circuit.

System 600 also includes optional sensing circuitry in some embodiments. Floating supplies supply integrated low sensing circuitry in parallel with the SC-Fine DAC (shown in block 624) for sensing small signals directly without high voltage switches with low voltage circuitry from flying caps referenced to parallel-series charge pump levels. The output voltage (at node $V_{SENS}$) is sensed by an amplifier 616 and ADC 612, and by amplifier 618 and ADC 614. The sensing branch including amplifier 618 and ADC 614 can include an optional switch $S_{SENSE}$. The sensed driver output voltage and/or current is used to control driver operation. The output voltage is further sensed by an amplifier 628 and ADC 630 through a capacitive ($C_1$ and $C_2$) and resistive ($R_1$ and $R_2$) divider.

Figure 7:
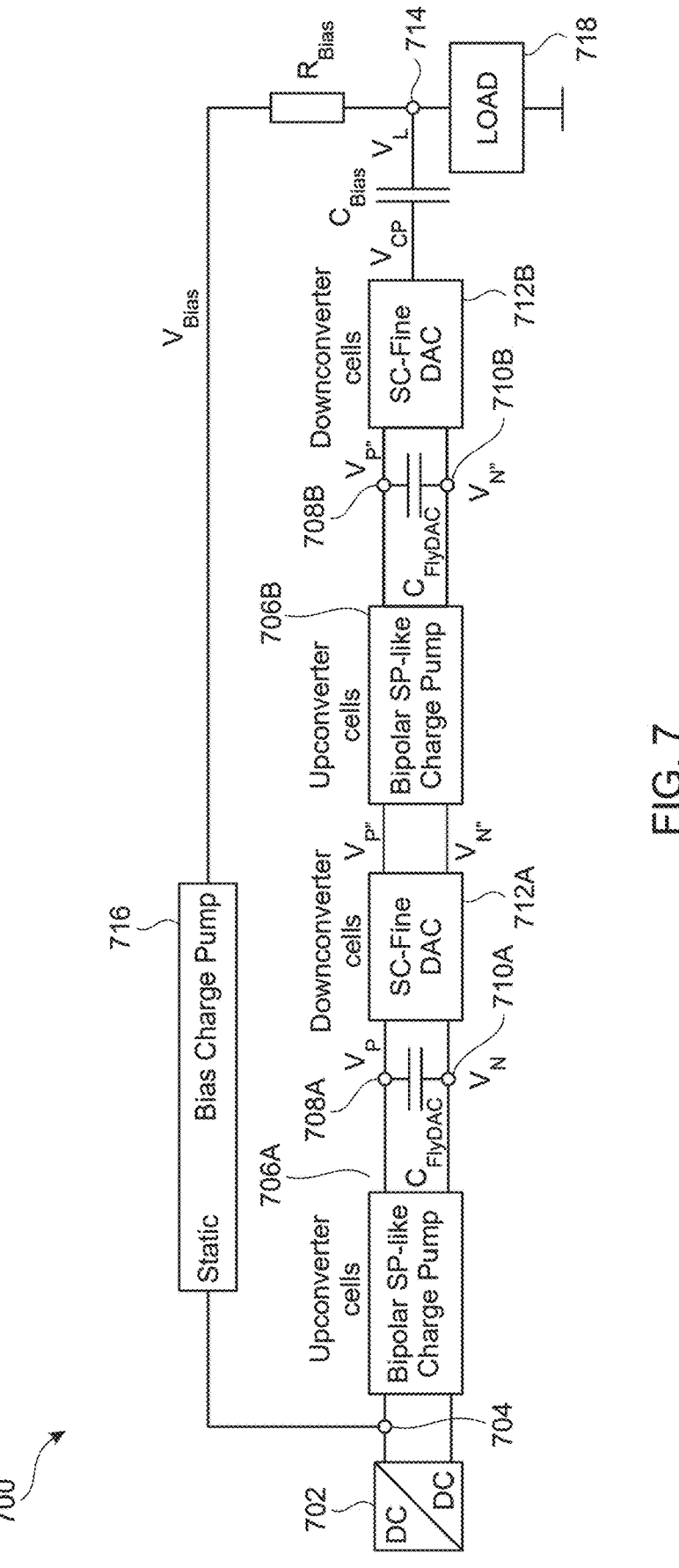
FIG. 7 is a block diagram of a load driver circuit according to another embodiment.

FIG. 7 is a block diagram of a load driver circuit 700 according to another embodiment. Driver circuit comprises a plurality of series-connected macro cells (706A/712A, 706B/712B) wherein each macro cell comprises a plurality of up-converting cells (embodied in SP charge pump 706A or SP charge pump 706B) for generating a plurality of coarse signal steps; and a plurality of down-converting cells (embodied in Fine DAC 712A or Fine DAC 712B) for generating a plurality of fine signal steps by dividing each of the coarse signal steps. Each macro cell also comprises a flying capacitor $C_{FlyDAC}$ interposed between the SP charge pump and the Fine DAC. A first flying capacitor $C_{FlyDAC}$ is coupled between node 708A and node 710A ($V_P$ and $V_N$). A second flying capacitor $C_{FlyDAC}$ is coupled between node 708B and node 710B (VP" and VN"). The term "up-converting" is used since the $V_{In}$ input voltage is "up-converted" in voltage to a maximum voltage greater than the $V_{In}$ voltage at the $V_P$ and $V_N$ nodes. The term "down-converting" is used since the voltage at the $V_{DDN}$ and $V_{SSN}$ nodes is "down-converted" in voltage to an output voltage than is less than the differential voltage at the $V_P$ and $V_N$ nodes.

Load driver circuit 700 also including an optional DC/DC converter 702 coupled to node 704, a $C_{Bias}$ capacitor coupled between the VCP node and the VL node (node 714), a quasi-static charge pump 716 coupled between node 704 and the $V_{Bias}$ node, and a bias resistor $R_{Bias}$ coupled between the $V_{Bias}$ node and node 714. A load 718 is coupled to the VL node (node 714). Load 718 can comprise a MEMS device as a speaker, an actuator, a sensor, a capacitive load, or any other appropriate load. These additional components have been previously described.

Both SP charge pumps 706A and 707B have two inputs and two outputs, and have been previously described. Fine DAC 712B has two inputs and only one output, which has also been previously described. However, Fine DAC 712A has two input and two outputs, which has not been previously described. While Fine DAC 712A is similar to a Fine DAC previously described, it includes a different output switch topography, which is described below with respect to the schematic diagram of FIG. 8. If more than two macro cells are used, all of the fine DAC circuits, except for the fine DAC in a last macro cell will have the circuit as is shown in FIG. 8.

Figure 8:
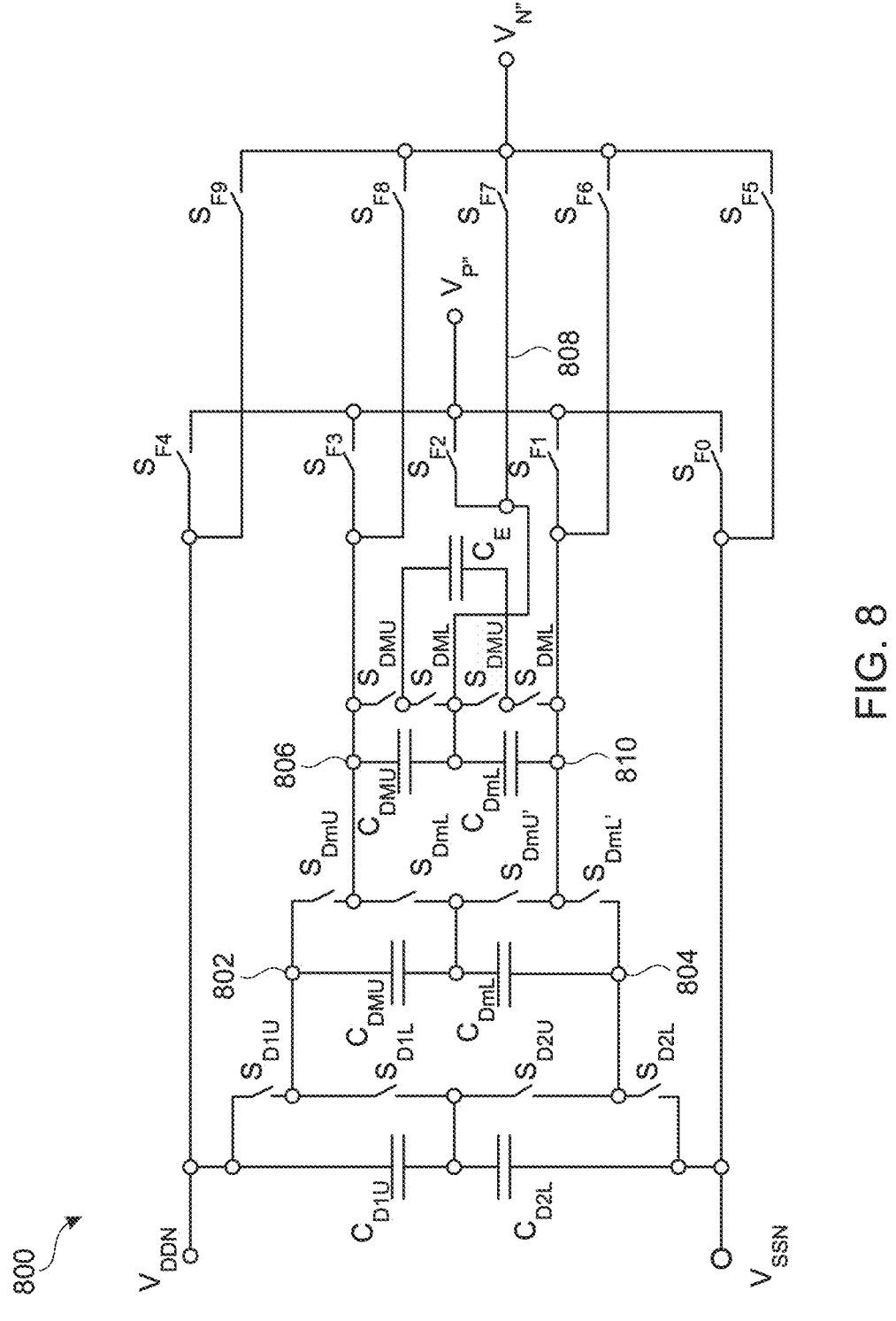
FIG. 8 is a schematic diagram of a fine DAC according to another embodiment, associated with the load driver circuit of FIG. 7.

FIG. 8 is a schematic diagram of a fine DAC 800 according to another embodiment, particularly including two inputs ($V_{DDN}$ and $V_{SSN}$ nodes), and two outputs (VP" and VN" nodes). Fine DAC 800 thus includes capacitors $C_{D1U}$ and $C_{D1L}$ and switches $S_{D1U}$, $S_{D1l}$, $S_{D2U}$, and $S_{D2L}$, coupled between the $V_{DDN}$ and $V_{SSN}$ nodes and nodes 802 and 804. Fine DAC 800 includes capacitors $C_{DmU}$ and $C_{DmL}$ and switches $S_{DmU}$, $S_{DmL}$, $S_{DmU'}$, and $S_{DmL'}$, coupled between nodes 802 and 804 and nodes 806 and 808. Fine DAC 800 also includes capacitors $C_{DMU}$, $C_{DML}$, and $C_E$ and switches $S_{DMU}$, $S_{DML}$, $S_{DMU'}$, and $S_{DML'}$, coupled between nodes 806 and 810. These components have all been described below with reference to fine DAC 500D shown in FIG. 5D. However, fine DAC 800 includes additional switches $S_{F0}$, $S_{F1}$, $S_{F2}$, $S_{F3}$, and $S_{F4}$ to couple, respectively, the $V_{SSN}$ node, node 810, node 808, node 806, and the $V_{DDN}$ node to node $V_P$". Fine DAC 800 includes additional switches $S_{F5}$, $S_{F6}$, $S_{F7}$, $S_{F8}$, and $S_{F9}$ to couple, respectively, the $V_{SSN}$ node, node 810, node 808, node 806, and the $V_{DDN}$ node to node $V_N$".

In some embodiments, the timing and DAC steps of the load driver circuit and timing is controlled directly or indirectly by a delta-sigma modulator or register setting. The control signals of the switches described above can also be controlled by an external or integrated controller.

In some embodiments the load can comprise a capacitive MEMS load such as a cell phone speaker or a MEMS is used to elicit static pressure, a gas flow, or a pressure modulation as sound waves, infra, or ultra-sound waves.

Example embodiments of the present invention are summarized here. Other embodiments can also be understood from the entirety of the specification and the claims filed herein.

Example 1. According to an embodiment, a driver circuit comprises a series-parallel charge pump comprising a plurality of switched capacitor cells, wherein the series-parallel charge pump is configured for generating a plurality of coarse signal steps at a first output node and a second output node; a flying capacitor, capacitor array or storage element coupled between the first output node and the second output node; and a digital-to-analog converter (DAC) coupled between the first output node and the second output node comprising a plurality of switched capacitors configured for generating a plurality of fine signal steps.

Example 2. The driver circuit of Example 1, wherein the series-parallel charge pump comprises a bipolar series-parallel charge pump.

Example 3. The driver circuit of any of the above examples, further comprising a bias capacitor coupled to an output of the DAC and a load coupled to the bias capacitor.

Example 4. The driver circuit of any of the above examples, further comprising a quasi-static bias charge pump having an input coupled to an input of the series-parallel charge pump; and a bias resistor coupled between an output of the quasi-static bias charge pump and a junction between the bias capacitor and the load.

Example 5. The driver circuit of any of the above examples, further comprising a DC-DC converter coupled to an input of the series-parallel charge pump.

Example 6. The driver circuit of any of the above examples, wherein the DAC comprises a first capacitor coupled between the first output node and a first intermediate node; a second capacitor coupled between the second output node and a second intermediate node; and a decoder coupled to the first output node, the second output node, the first intermediate node, and the second intermediate node.

Example 7. The driver circuit of any of the above examples, wherein the decoder comprises a one-hot decoder.

Example 8. The driver circuit of any of the above examples, wherein the DAC comprises an energy storage capacitor array configured for providing a plurality of intermediate voltages between a first output node voltage and a second output node voltage; and a switch array configured for selectively coupling the plurality of intermediate voltages to an output of the DAC.

Example 9. The driver circuit of any of the above examples, further comprising a refresh and initialization circuit coupled to the first output node and the second output node, and coupled to the energy storage capacitor array.

Example 10. The driver circuit of any of the above examples, wherein the DAC comprises a combined energy storage and capacitive divider array configured for providing a plurality of intermediate voltages between a first output node voltage and a second output node voltage; and a switch array configured for selectively coupling the plurality of intermediate voltages to an output of the DAC.

Example 11. The driver circuit of any of the above examples, further comprising a refresh and initialization circuit coupled to the combined energy storage and capacitive divider array.

Example 12. The driver circuit of any of the above examples, wherein the DAC comprises a plurality of serially coupled unit cells configured to implement a binary weighted sum of shifted input voltage fractions, wherein each unit cell comprises of a pair of serially-coupled capacitors and two pairs of switches coupled to the pair of serially-coupled capacitors; and a multiplexer coupled to a least one of the unit cells.

Example 13. The driver circuit of any of the above examples, further comprising an additional capacitor coupled to a last unit cell in the plurality of serially coupled unit cells.

Example 14. The driver circuit of any of the above examples, wherein the DAC comprises a plurality of unit cells, wherein each unit cell comprises a plurality of serially-coupled capacitor strings, wherein each capacitor string comprises one or more capacitors; and a pair of switches coupled to each capacitor in the DAC, wherein a first capacitor string comprises "M" serial-coupled capacitors, wherein "M" is an integer greater than one, and a last capacitor string comprises a single capacitor.

Example 15. The driver circuit of any of the above examples, wherein a number of capacitors in each successive unit cell between the first capacitor string and the last capacitor string decreases by one capacitor.

Example 16. The driver circuit of any of the above examples, wherein the DAC comprises a plurality of unit cells, and wherein at least one of the plurality of unit cells comprises a capacitor; and a half-bridge switch coupled to the capacitor, wherein the half-bridge switch is configured for selectively coupling the at least one of the plurality of unit cells to a next unit cell of the plurality of unit cells.

Example 17. The driver circuit of any of the above examples, further comprising an additional half-bridge switch interposed between the flying capacitor and a first unit cell of the plurality of unit cells.

Example 18. According to an embodiment, a driver circuit comprises a series-parallel charge pump configured for generating a plurality of coarse signal steps; a digital-to-analog converter (DAC) coupled to the series-parallel charge pump comprising a plurality of switched capacitors; and a flying capacitor interposed between the series-parallel charge pump and the DAC, wherein the DAC is configured for generating a plurality of fine signal steps and for charging the plurality of switched capacitors only when a load is coupled to the driver circuit.

Example 19. According to an embodiment, a driver circuit comprises a plurality of series-connected macro cells, wherein each macro cell comprises a plurality of up-converting cells for generating a plurality of coarse signal steps; and a plurality of down-converting cells for generating a plurality of fine signal steps by dividing each of the coarse signal steps.

Example 20. The driver circuit of Example 19, further comprising a load coupled to the plurality of down-converting cells, wherein the load comprises a MEMS device, actuator, sensor or capacitive load.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A driver circuit comprising:
a series-parallel charge pump comprising a plurality of switched capacitor cells, wherein the series-parallel charge pump is configured for generating a plurality of coarse signal steps at a first output node and a second output node;

16 a flying capacitor, capacitor array or storage element coupled between the first output node and the second output node; and
a digital-to-analog converter (DAC) coupled between the first output node and the second output node comprising a plurality of switched capacitors configured for generating a plurality of fine signal steps.

2. The driver circuit of claim 1, wherein the series-parallel charge pump comprises a bipolar series-parallel charge pump.

3. The driver circuit of claim 1, further comprising a bias capacitor coupled to an output of the DAC and a load coupled to the bias capacitor.

4. The driver circuit of claim 3, further comprising:
a quasi-static bias charge pump having an input coupled to an input of the series-parallel charge pump; and
a bias resistor coupled between an output of the static bias charge pump and a junction between the bias capacitor and the load.

5. The driver circuit of claim 1, further comprising a DC-DC converter coupled to an input of the series-parallel charge pump.

6. The driver circuit of claim 1, wherein the DAC comprises:
a capacitor coupled between the first output node and a first intermediate node;
a decoder coupled to the first output node and the first intermediate node.

7. The driver circuit of claim 6, wherein the decoder comprises a one-hot decoder.

8. The driver circuit of claim 1, wherein the DAC comprises:
an energy storage capacitor array configured for providing a plurality of intermediate voltages between a first output node voltage and a second output node voltage; and
a switch array configured for selectively coupling the plurality of intermediate voltages to an output of the DAC.

9. The driver circuit of claim 8, further comprising a refresh and initialization circuit coupled to the first output node and the second output node, and coupled to the energy storage capacitor array.

10. The driver circuit of claim 1, wherein the DAC comprises:
a combined energy storage and capacitive divider array configured for providing a plurality of intermediate voltages between a first output node voltage and a second output node voltage; and
a switch array configured for selectively coupling the plurality of intermediate voltages to an output of the DAC.

11. The driver circuit of claim 10, further comprising a refresh and initialization circuit coupled to the combined energy storage and capacitive divider array.

12. The driver circuit of claim 1, wherein the DAC comprises:
a plurality of serially coupled unit cells configured to implement a binary weighted sum of shifted input voltage fractions, wherein each unit cell comprises a pair of serially-coupled capacitors and two pairs of switches coupled to the pair of serially-coupled capacitors; and
a multiplexer coupled to a least one of the unit cells.

13. The driver circuit of claim 12, further comprising an additional capacitor coupled to a last unit cell in the plurality of serially coupled unit cells.

14. The driver circuit of claim 1, wherein the DAC comprises a plurality of unit cells, wherein each unit cell comprises:

a plurality of serially-coupled capacitor strings, wherein each capacitor string comprises one or more capacitors; and a pair of switches coupled to each capacitor in the DAC, wherein a first capacitor string comprises "M" serial-coupled capacitors, wherein "M" is an integer greater than one, and a last capacitor string comprises a single capacitor.

15. The driver circuit of claim 14, wherein a number of capacitors in each successive unit cell between the first capacitor string and the last capacitor string decreases by one capacitor.

16. The driver circuit of claim 1, wherein the DAC comprises a plurality of unit cells, and wherein at least one of the plurality of unit cells comprises:

a capacitor; and a half-bridge switch coupled to the capacitor, wherein the half-bridge switch is configured for selectively coupling the at least one of the plurality of unit cells to a next unit cell of the plurality of unit cells.

17. The driver circuit of claim 16, further comprising an additional half-bridge switch interposed between the flying capacitor and a first unit cell of the plurality of unit cells.

\*   \*   \*   \*   \*